US006304268B1

(12) United States Patent
Iourcha et al.

(10) Patent No.: US 6,304,268 B1
(45) Date of Patent: Oct. 16, 2001

(54) TRILINEAR TEXTURE FILTERING OF TWO LEVELS OF DETAIL BASED ON A SINGLE LEVEL OF DETAIL

(75) Inventors: Konstantine I Iourcha, San Jose; Fred Liao, Union City; Michael Hong, San Jose, all of CA (US)

(73) Assignee: S3 Graphics Co., Ltd. (KN)

( * ) Notice: Subject to any disclaimer, the term of this patent is extended or adjusted under 35 U.S.C. 154(b) by 0 days.

(21) Appl. No.: 09/195,845

(22) Filed: Nov. 19, 1998

Related U.S. Application Data

(63) Continuation-in-part of application No. 08/883,536, filed on Jun. 26, 1997, now Pat. No. 5,945,997.
(60) Provisional application No. 60/095,994, filed on Aug. 10, 1998.

(51) Int. Cl.[7] .................................................. G06T 17/00
(52) U.S. Cl. ............................................ 345/428; 345/430
(58) Field of Search .................................... 345/428, 429, 345/430, 425

(56) References Cited

U.S. PATENT DOCUMENTS

| | | | | |
|---|---|---|---|---|
| 5,097,427 | * | 3/1992 | Lathrop et al. | 345/430 |
| 5,490,240 | * | 2/1996 | Foran et al. | 345/430 |
| 5,548,709 | * | 8/1996 | Hannah et al. | 345/510 |
| 5,740,343 | * | 4/1998 | Tarolli et al. | 345/430 |
| 5,801,708 | * | 9/1998 | Alcorn et al. | 345/430 |
| 5,831,624 | * | 11/1998 | Tarolli et al. | 345/430 |
| 5,945,997 | * | 8/1999 | Zhao et al. | 345/430 |
| 5,949,426 | * | 9/1999 | Rich | 345/430 |
| 5,986,663 | * | 11/1999 | Wilde | 345/428 |
| 5,987,567 | * | 11/1999 | Rivard et al. | 711/118 |

* cited by examiner

Primary Examiner—Cliff N. Vo
(74) Attorney, Agent, or Firm—Carr & Ferrell LLP

(57) ABSTRACT

A trilinear texture filtering system and method that improves the locality of texture map accesses in a multum in parvo (MIP) map so as to reduce page breaks and provide improved performance. The present invention includes a texture cache having a unique addressing and accessing scheme that allows localized reads of the texture map from each of four banks in the texture cache. This is coupled with a unique texture-mapping unit that includes a first level generator, a second level generator and an interpolator. In generating the lower-resolution texture map version, the present invention filters neighboring texels from the higher-resolution version. Thus, an n×n (e.g. 2×2) square of texels at the higher-resolution level is reduced to a single texel at the lower-resolution level. This technique permits the lower-resolution level to be derived without requiring additional read operations from texture memory with potentially poor locality. Furthermore, the generation of the lower-resolution level texel according to the present invention is performed in less time than required to retrieve the texel from memory. Interpolation can then be performed using the higher-resolution version and the derived lower-resolution version.

19 Claims, 18 Drawing Sheets

| | 000 | 001 | 010 | 011 | 100 | 101 | 110 | 111 |
|---|---|---|---|---|---|---|---|---|
| 000 | U0-A0 | U0-B0 | U0-A1 | U0-B1 | U0-A0 | U0-B0 | U0-A1 | U0-B1 |
| 001 | U0-C0 | U0-D0 | U0-C1 | U0-D1 | U0-C0 | U0-D0 | U0-C1 | U0-D1 |
| 010 | U0-A2 | U0-B2 | U0-A3 | U0-B3 | U0-A2 | U0-B2 | U0-A3 | U0-B3 |
| 011 | U0-C2 | U0-D2 | U0-C3 | U0-D3 | U0-C2 | U0-D2 | U0-C3 | U0-D3 |
| 100 | U0-A0 | U0-B0 | U0-A1 | U0-B1 | U0-A0 | U0-B0 | U0-A1 | U0-B1 |
| 101 | U0-C0 | U0-D0 | U0-C1 | U0-D1 | U0-C0 | U0-D0 | U0-C1 | U0-D1 |
| 110 | U0-A2 | U0-B2 | U0-A3 | U0-B3 | U0-A2 | U0-B2 | U0-A3 | U0-B3 |
| 111 | U0-C2 | U0-D2 | U0-C3 | U0-D3 | U0-C2 | U0-D2 | U0-C3 | U0-D3 |

Block [00] 910
Block [01] 912
Block [10] 914
Block [11] 916
930

FIG. 11A

TRILINEAR TEXTURE FILTERING OF TWO LEVELS OF DETAIL BASED ON A SINGLE LEVEL OF DETAIL

CROSS-REFERENCES TO A RELATED APPLICATION

This application is a continuation-in-part of U.S. patent application Ser. No. 08/883,536 for "Block- and Band-Oriented Traversal in Three-Dimensional Triangle Rendering", filed Jun. 26, 1997, now U.S. Pat. No. 5,945,997, and a continuation-in-part of U.S. Provisional Patent Application No. 60/095,994, entitled Trilinear Texture Filtering With Optimized Memory Access, filed Aug. 10, 1998.

BACKGROUND OF THE INVENTION

1. Field of the Invention

The present invention relates generally to texture mapping in graphics systems, and more particularly to a system and method of implementing trilinear texture filtering with an optimized memory access scheme.

2. Description of Background Art

Texture mapping is a well-known technique of projecting a texture onto a surface in a graphics system. Typical applications of the technique involve reading texture data (texels) of a two-dimensional texture that represent a digitized image, and mapping the texture data onto a surface that is defined in three-dimensional space. The surface, when rendered and projected onto a two-dimensional display, is imbued with greater realism as it appears to contain the surface characteristics defined in the texture map.

In many applications, such as video games, the three-dimensional surfaces have widely varying dimensions and shapes. Some surfaces, representing objects that appear to be far away from the viewer, may be relatively small, while other surfaces, representing objects that appear to be closer, may be large. In order to allocate resources efficiently and avoid wasting valuable processor time, it is beneficial to vary the amount of detail presented for on-screen objects according to their relative apparent proximity to the viewer. Smaller, far-away objects may be rendered in less detail than larger, close-up objects, without unduly compromising the user experience.

One problem in rendering three-dimensional images is the image quality produced by applying textures to primitives such as triangles and polygons. Especially when the discrete image is generated by sampling an abstract image, visual artifacts are often included in the discrete image. Often the images need to be filtered to remove visual artifacts such as banding or aliasing effects. Additional artifacts such as banding are also caused by morphing or transforming images between various levels of detail in an image.

Multum in parvo mapping (MIP mapping) is a technique used in graphics applications to alleviate problems such as those described above and to provide varying levels of detail in texture mapping. It is based on a scheme wherein several levels of detail are made available for a particular texture map. One particular type of MIP mapping scheme is referred to as "trilinear texture filtering" because the value for a particular texel at a particular resolution level is interpolated on three values: the x-coordinate, u; the y-coordinate, v; and a linear description of the level of detail, d. Those skilled in the art will recognize that a variety of different filtering methods may be used. By using a texture map version having an appropriate level of detail for the parameters of the rendered image, MIP map schemes tend to improve the image quality by reducing the effects of the visual artifacts, and without unduly increasing the computations and resources needed.

Prior art approaches to trilinear texture filtering typically store several versions of a particular texture map, at varying levels of detail. Usually, these levels are defined by powers of two, for example, a 2×2 square containing four texels corresponding to one texel at the next higher level of detail is filtered (averaged) to produce the next upper level texel. In the limit, the entire texture map may be reduced to one texel at the lowest level of detail.

When a texture is being mapped, a desired level of detail is selected. As an on-screen object moves "closer to" or "farther away from" the user's point of view, this requires a change in the selected level. In other words, an object's apparent distance from the user may change from frame to frame, and where such changes cause a different stored texture map version to be used, a visible and undesirable discontinuity in resolution may occur.

Accordingly, some MIP map engines employ interpolation to provide intermediate levels of detail between stored texture map versions. In essence, such techniques gradually shift from one version to the next, so that little or no discontinuity is perceived. Conventional interpolation in MIP map engines occurs as follows. The two stored texture map versions having the closest levels of detail to the selected level are used. Four samples are read from each of the two levels. Each set of four samples is bi-linearly interpolated, resulting in two values, one for each level of detail. The bilinear interpolation is performed according to the x- and y-coordinates of the point being mapped. The two interpolated values are then interpolated according to the fractional component of the initially selected level of detail to derive a final value for the selected point. See, for example, Williams, "Pyramidal Parametrics," SIGGRAPH '83.

The above-described scheme requires that two read operations be performed to retrieve samples used in texture mapping. This is a particular problem because the processing speeds of graphic engines used to perform the mapping have increased to the point where the two read operations are the primary limitation on performance as opposed to the computation time in processing the retrieved samples. The problems with memory bandwidth and access speed are only increased because of the nature of the type of read operations being performed. The use of MIP maps requires that the samples are read from two portions of the texture map storage area, corresponding to the two levels of detail to be used in interpolation. These two areas of the texture map storage area may be, and typically are, widely separated in physical memory. The most costly type of read (in terms of performance) is one that causes a "page break", resulting in additional overhead. Since the interpolated MIP map scheme described above often fails to take advantage of memory locality, the two reads involved in retrieving the texture map versions often cause a page break, which may result in reduced speed and performance. In addition, the requirement of reading two texture map versions creates increased bandwidth requirements. Caching can be used to alleviate these problems, but only to a limited extent. Caching and other known performance-enhancing memory access techniques rely on memory locality for successive reads—two consecutive reads that are close together in physical memory may take place faster than two reads that are farther apart.

What is needed is a technique for implementing trilinear texture filtering that improves memory locality so as to reduce or eliminate page breaks and improve performance in graphics systems.

SUMMARY OF THE INVENTION

In accordance with the present invention, there is provided a system and method of trilinear texture filtering that improves the locality of texture map accesses in order to reduce page breaks and provide improved performance. Rather than retrieving two neighboring texture map levels, the present invention reads one level of the MIP map. Relevant portions of the lower-resolution level are derived from the retrieved level, so that the lower-resolution level need not itself be retrieved from memory. This serves to reduce memory traffic, reduce bandwidth requirements, and reduce page breaks resulting from poor locality in memory accesses. Furthermore, the present invention is able to provide the trilinear filtered values faster than prior art approaches requiring two memory accesses.

In generating the lower-resolution texture map version, the present invention filters neighboring texels from the higher-resolution version. Thus, an n×n (e.g. 2×2) square of texels at the higher-resolution level is reduced to a single texel at the lower-resolution level. This technique permits the lower-resolution level to be derived without requiring additional read operations from texture memory with potentially poor locality. Furthermore, the generation of the lower-resolution level texel according to the present invention is performed in less time than required to retrieve the texel from memory. Interpolation can then be performed using the higher-resolution version and the derived lower-resolution version.

An additional advantage that may apply in some embodiments is that the present invention is capable of operation with relatively fewer stored texture maps, which can reduce memory utilization. This is particularly advantageous when use in conjunction with a larger texture cache because memory reads are minimized by the locality of the texels especially for processing of successive pixels of a particular triangle using the same MIP map. Intermediate resolution levels can be derived by the techniques disclosed herein. Indeed, in one embodiment, the invention uses only one stored texture map. Thus, where memory is scarce or of limited availability, the present invention facilitates interpolated MIP map texture mapping with fewer stored texture maps.

BRIEF DESCRIPTION OF THE DRAWINGS

FIGS. 11A through 11D include a diagram showing an addressing scheme for the texture cache of the present invention and examples of the number of blocks read based on block read masks and cell addresses.

DETAILED DESCRIPTION OF THE INVENTION

Before describing the present invention with particularity, MIP maps and their use in texture mapping will be described for ease of understanding the present invention and for establishing notation conventions used to describe the present invention. While the invention is described below with regard to these specific conventions and embodiments, those skilled in the art will recognize that the principles of the present invention may be extended or expressed in a variety of other embodiment and using other notations.

MIP Map Texture Mapping

Figure 1:
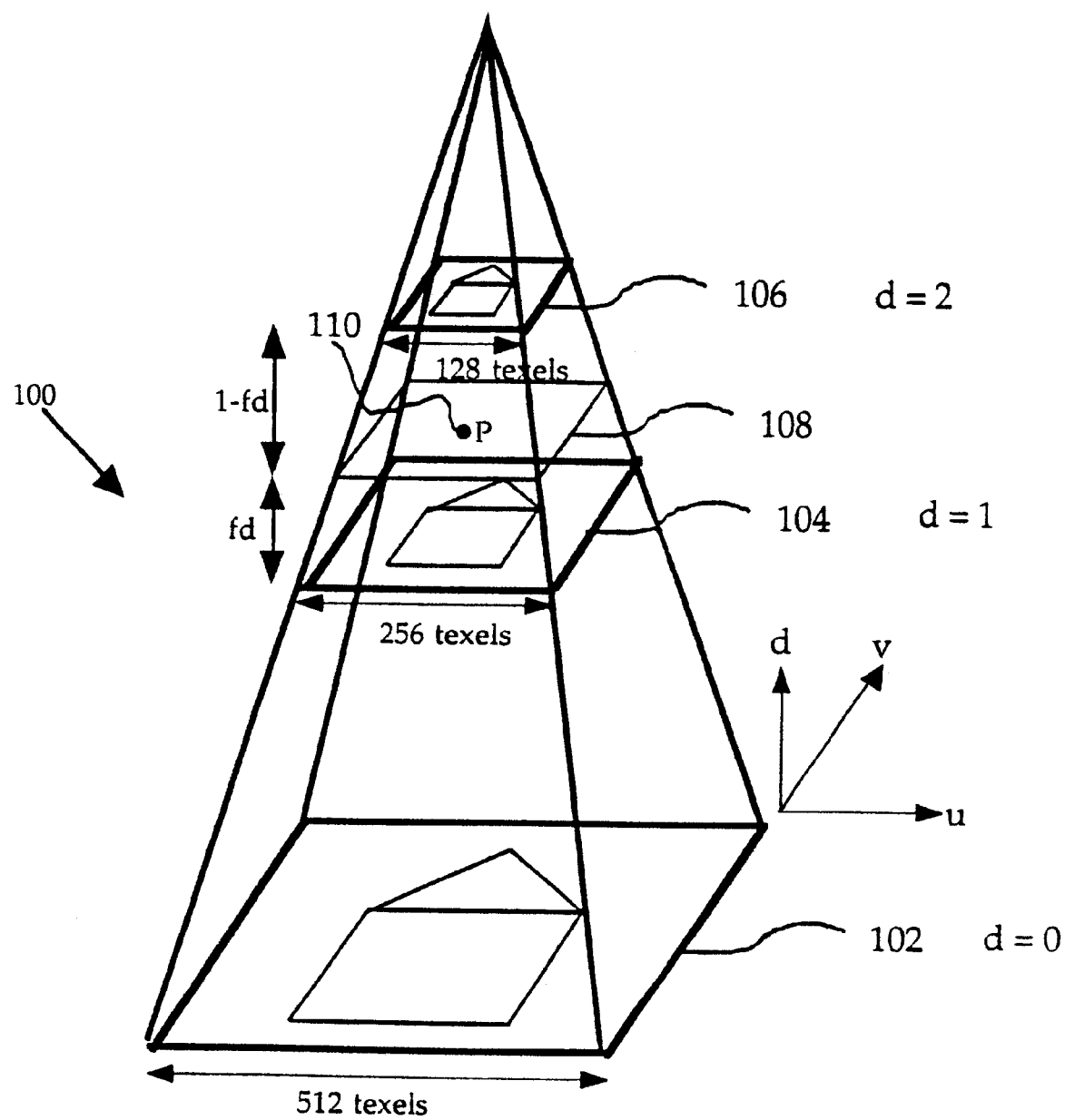
FIG. 1 shows an example of MIP map for use in performing texture mapping.

Referring now to FIG. 1, there is shown an example of MIP map 100 used for texture mapping. A first level of a texture map 102 is shown having dimensions of 512 texels by 512 texels. A texture image is stored in texture map 102 at full size. The texel or texture data is defined in terms of a first value and a second value. More particularly, the first value can be expressed as $u+\alpha$, where u represents an integer component and $\alpha$ represents a fractional component of the first value. Similarly, the second value can be expressed as $v+\beta$, where v represents an integer component and $\beta$ represents a fractional component of the second value. Additional representations or levels 104, 106 of the texture image are also shown, having successively lower levels of detail. Level of detail represents a scaling factor to be used in texture mapping, which can be expressed as id+fd where id represents an integer portion of the level of detail and fd represents a fractional portion of the level of detail. For example, when the texture image is to be rendered on a relatively small primitive, such as one having a greater perceived distance, less detail is needed than when the texture image is to be rendered on a larger primitive. Although the above notations are used throughout this description of the present invention, those skilled in the art will recognize that any number of other notations could be used such as where the integer and fractional portions of the first value are respectively ui and uf, and the integer and fractional portions of the second value are respectively vi and vf. The above notations are used only by way of example and for convenience.

Averaging or otherwise filtering adjacent texels in the full-size image 102 generates the smaller representations or levels 104, 106. For example, a 256 by 256 texel representation 104 is generated from full-size image 102 by filtering texel values for a 2×2 square on level d=0 to derive a texel value for a single texel in the smaller representation on level d=1. The filtering process is performed for successively larger sets of texels as the level of detail decreases (the 128-texel square filters 4×4 squares, etc.). For convenience and ease of understanding, the present invention assumes that the image has uniform dimensions. In general, texel values for N texels in a M×M square are filtered (averaged) to generate one pixel in a smaller representation, where:

$$M=(\text{width of full size image})/(\text{width of smaller image}) \quad (\text{Eq. 1})$$

and usually $$N \geq M^2 \quad (\text{Eq. 2})$$

Figure 2:
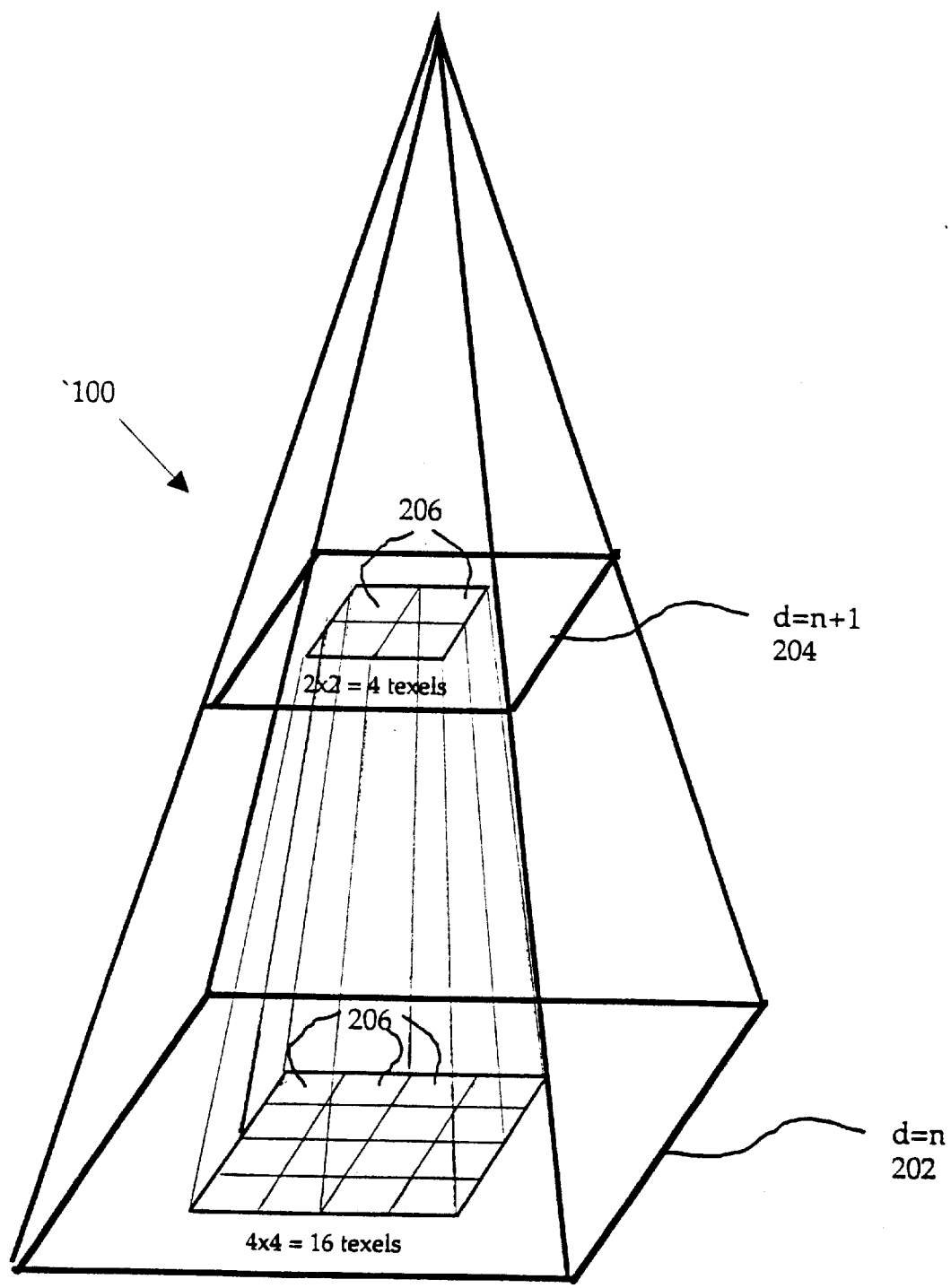
FIG. 2 shows an example of a texture map portion represented at two levels of detail.

Typically, such texel filtering is performed in advance, and several representations at varying resolutions are stored in the MIP map 100. As best shown in FIG. 2, there is shown an example of a portion of the MIP map 100 with two levels 202, 204 shown in more detail. A first level, d=n, 202 is a relatively high-resolution level, while a second level, d=n+1, 204 is a relatively low-resolution level. In one embodiment, both levels 202, 204 are stored in texture memory (not shown). Each level 202, 204 contains a number of texels 206 (texture elements) that define a set of channel value(s), such as color (RGB), for various positions in the texture map. The following descriptions presents a method for generating a channel value for any position in the texture map at an level of detail that is intermediate between two stored levels 202, 204.

Sixteen texels 206 are shown forming part of the first level 202, in a 4×4 grid. The corresponding portion of the texture map is represented by four texels 206 in the second level 204, in a 2×2 grid. Thus, each texel 206 in the second level 204 corresponds to a group of four texels 206 in the first level 206. According to this exemplary embodiment of the present invention, a second level texel 206 can thus be derived by filtering or averaging channel values for four texels 206 in the first level 202. Channel values for the first and second levels 202, 204 can then be combined to yield a final channel value for any given pixel.

Dimensions corresponding to powers of two are preferred for ease of calculation, however this is not required. A square texture image 102 is shown for illustrative purposes, though other shapes such as triangles and rectangles may be used. In particular, a rectangular texture image may be used wherein the scaling factors along the u-axis and v-axis are not equal, so that in effect there is uneven scaling relative to the type of projection or for providing other adjustments in scaling along one relative to the other. This may be beneficial when, for example, the particular image demands additional resolution along a horizontal axis than along a vertical axis. However, in the following discussion, uniform scaling factors along both axes are assumed.

In one embodiment, the texture map representation from the MIP map 100 collection of representations 102, 104, 106 is selected based on the level of detail, id+fd. Referring back to FIG. 1, the full-size representation 102 is designated as 0, representation 104 is designated as 1, representation 106 is designated as 2, and successively smaller (lower-resolutions) representations are designated as successively higher values of the level of detail. Typically, the integer portion of id defines these levels of detail.

Intermediate representations, such as level 108 are defined using the fractional portion of the level of detail, fd. The values on such an intermediate level 108 may be derived from adjacent levels 104, 106 rather than being stored, using the interpolation methods described below. Thus, a particular point, such as P 110, in the MIP map 100 can be produced using (u+α, v+β, id+fd). In other words, the MIP map is the source structure for producing the intermediate levels of detail.

Figure 3:
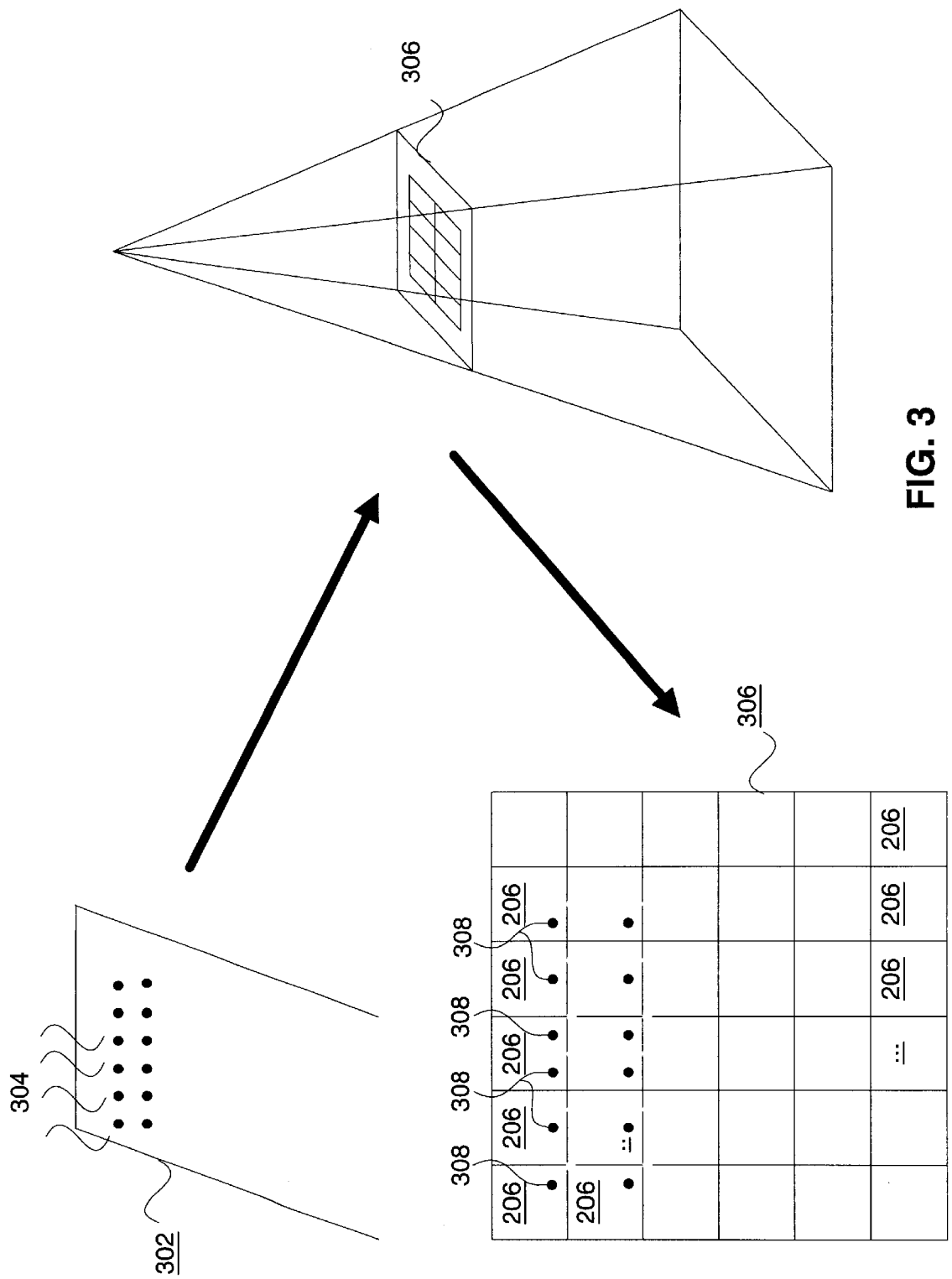
FIG. 3 shows an example of an on-screen primitive being rendered into frame buffer memory.

Referring now to FIG. 3, there is shown an example of a known method for rendering an on-screen primitive into a frame buffer memory (not shown). Each primitive 302 spans a number of pixels 304. In performing texture mapping, some channel value is to be applied to each pixel 304, based on the pattern stored in the applicable texture map portion 306. As described above, a level of detail d is retrieved and is based on several factors, such as the position of the object containing the primitive, available processor resources, screen size, and the like.

The texture map 306 corresponding to the retrieved level of detail is used. In the simplest case, where the desired level of detail d corresponds to one of the stored (integral) levels, the selected stored level can be read directly, and the texture mapped onto the primitive 302. Each pixel 304 can be mapped to a corresponding point 308 in the texture map 306. The point corresponds to one or more texels 206 that comprises channel values that are interpolated to derive channel values based on the locations of points 308 in map 306. In other words, for each pixel 304 in primitive 302, a channel value can be retrieved from map 306 and projected onto the surface being mapped.

Figure 4C:
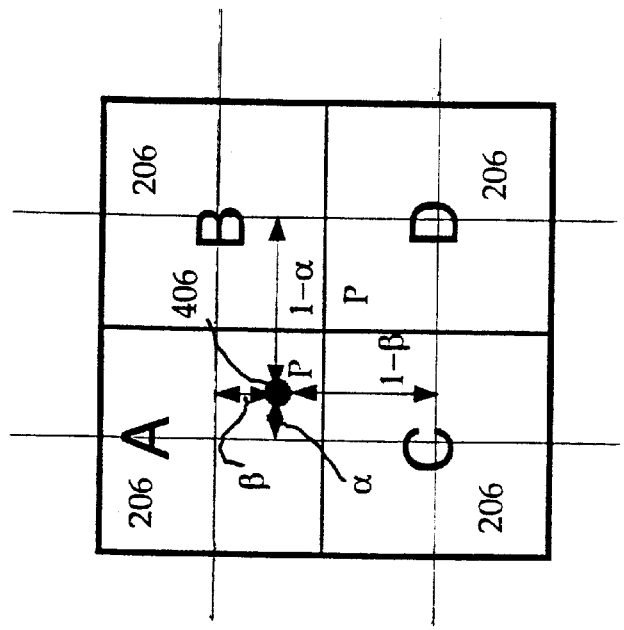
FIGS. 4A through 4C show examples of possible point positions and single-level texture mapping.
Figure 4B:
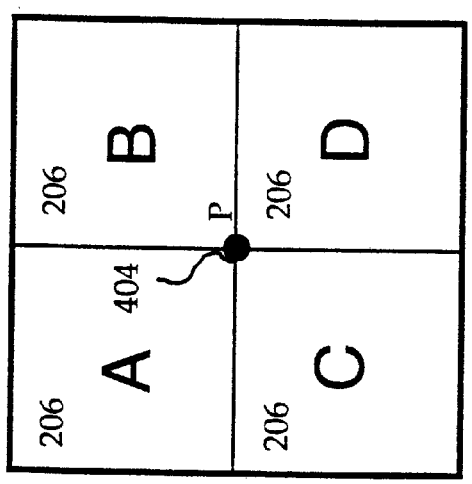
Figure 4A:
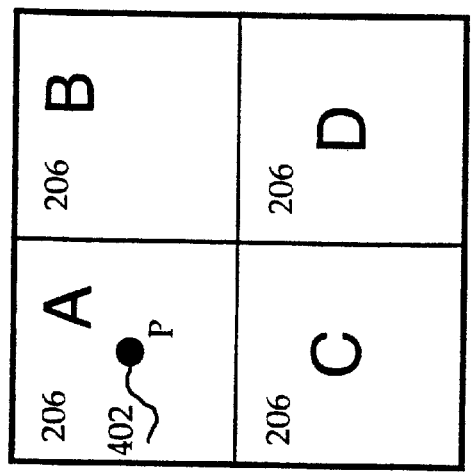

Referring now to FIGS. 4A through 4C, there are shown three examples of texture mapping. The preferred embodiments of the texture mapping showing in FIGS. 4A through 4C and described below are described with reference to use of one particular filter. However, those skilled in the art will recognize that the present invention may be used with any one of a number of other types of filtering known to those skilled in the art. FIG. 4A shows an example where point 402 (designated as P), representing the projection of a pixel 304 in the primitive being rendered, falls exactly in the center of texel A. If we represent the channel value for texel A as v(A), the value for point P is given as:

$$v(P)=v(A) \quad (\text{Eq. 3})$$

Referring now to FIG. 4B, there is shown an example where point P 404 falls at the intersection of four texels A, B, C, and D. The value for point P 404 is then derived by taking the average channel values for the four adjacent texels 206, texels A, B, C and D:

$$v(P)=(v(A)+v(B)+v(C)+v(D))/4 \quad (\text{Eq. 4})$$

Those skilled in the art will note that other types of filters may be used in place of equation 4, and averaging is used for convenience and ease of understanding.

FIG. 4C shows a more general case, where point P 406 falls at an arbitrary point in the texture map. The channel value for point P 406 is then interpolated using the values for the four nearest texels 422. Assuming that the width of each texel 206 is normalized to equal 1, if α represents the horizontal distance between point P and a line bisecting texels A and C (a horizontal fractional value), and β represents the vertical distance between point P and a line bisecting texels A and B (a vertical fractional value), as shown in FIG. 4C, the interpolated channel value assigned to point P 406 is given as:

$$v(P)=\alpha(\beta v(D)+(1-\beta)v(B))+(1-\alpha)(\beta v(C)+(1-\beta)v(A)) \quad (\text{Eq. 5})$$

Of course, Eq. 5 reduces to Eq. 3 when α=β=0, and reduces to Eq. 4 when α=β=0.5.

If the desired level of detail lies between two stored levels, the value of each texel 206 to be rendered is interpolated by reference to the two adjacent stored levels. The interpolation process, which is performed according to known methods, serves to reduce or eliminate perceived discontinuity when on-screen objects move closer to or farther away from the viewer. Both of the two nearest representations are averaged (or otherwise filtered) to generate a new representation more closely approximating the level of detail value.

For example, channel values for a particular point P at two levels are designated as $v_1(P)$ and $v_2(P)$. A new value is then generated from $v_1(P)$ and $v_2(P)$ using weighted averaging. Referring again to FIG. 1, intermediate representation or level 108 can be derived from representations 104 and 106 for a first and a second level. If a channel value for a particular point in representation 104 is given as $v_1(P)$, and a channel value for the corresponding point in representation 106 is given as $v_2(P)$, and the "distance" between the first level and the level for the intermediate level 108 is given as fd, the value for point P in the intermediate representation 108 is given particularly as:

$$v_d = (1-fd)(v_{id}) + fd(v_{id+1}) \quad \text{(Eq. 6)},$$

where d=the desired level of detail=id+fd (integer and fractional components, respectively) and where $0 \leq fd \leq 1$ and. The trilinear mapping scheme provides a more gradual shift from one MIP map representation to the next, and avoids the perceived discontinuity described previously.

Figure 5:
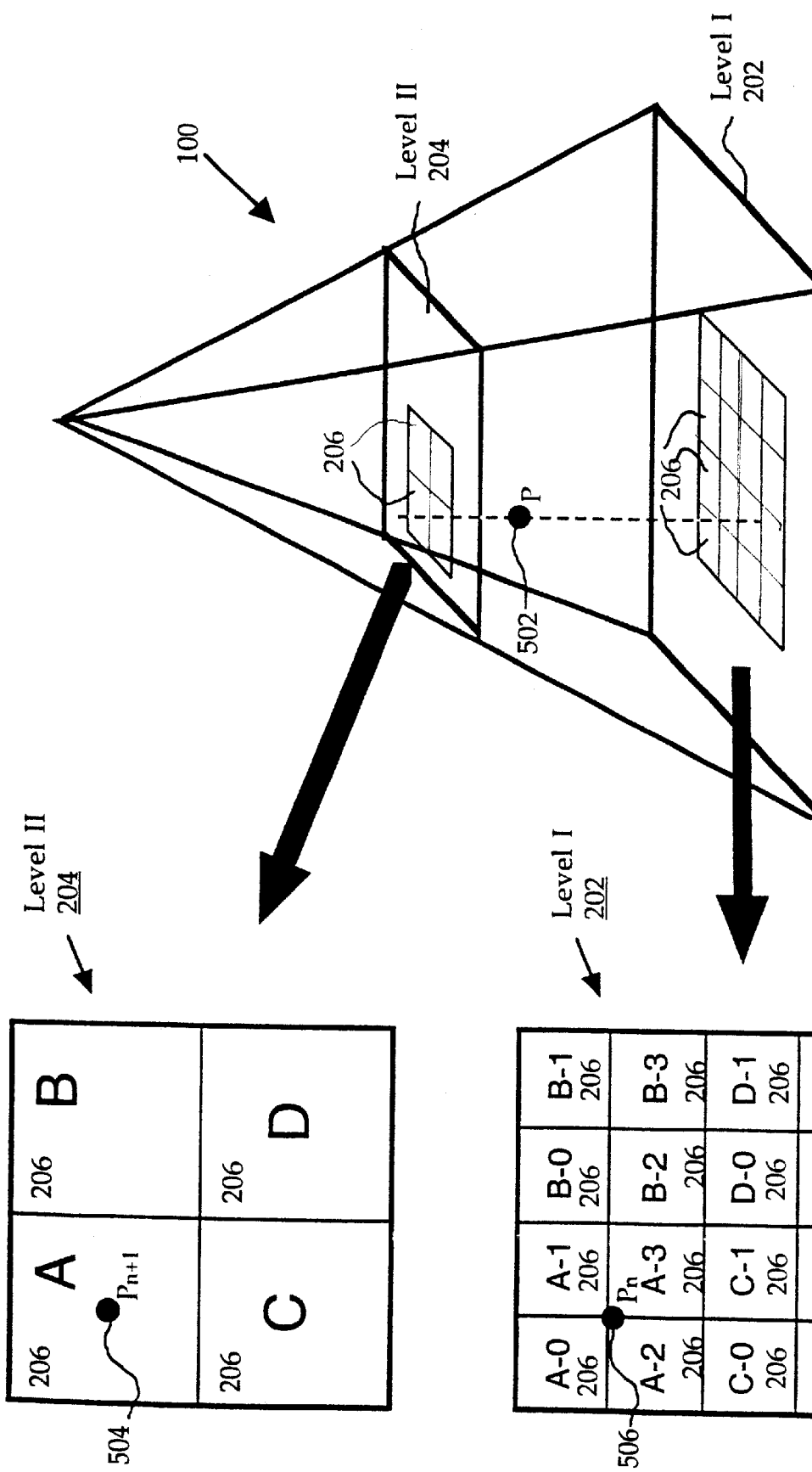
FIGS. 5 through 7 show examples of interpolated texture mapping.

Referring now to FIG. 5, there is shown an example of texture mapping corresponding to the example of FIG. 4A, where the projection of point P (502) lies at the center of texel A for the highest level of detail. Here, however, the selected level of detail is assumed to lie between two levels, designated as Level I and Level II. Texture map portion 204 of Level II shows a point $P_{n+1}$ 504 (the projection of point P 502 onto Level II) as lying at the center of texel A. Texture map portion 202 of Level I shows point $P_n$ (the projection of point P 502 onto Level I) as lying at the intersection of four texels 206, designated as A0, A1, A2, and A3.

According to the present invention, the channel value for point P 502 is interpolated based on texture maps 202, 204 at Levels I and II. Therefore, two values for point P, designated as $v_n(P_n)$ and $v_{n+1}(P_{n+1})$, are to be derived. As shown in portion 202, point $P_n$ lies at the intersection of four Level I texels 206. Thus, the value for Level I is simply the average values for the four texels 206:

$$v_n(P_n) = (v(A0) + v(A1) + v(A2) + v(A3))/4 \quad \text{(Eq. 7)}$$

Those skilled in the art will recognize that the present invention may employ any of various other types of filtering techniques for constructing the next level of detail map even though the present invention is described here as using bilinear filtering.

As shown in portion 204, the point $P_{n+1}$ lies at the center of a Level II texel 206. Thus, the value for Level II is simply the value for texel A:

$$v_{n+1}(P_{n+1}) = v(A) \quad \text{(Eq. 8)}$$

As discussed above, the present invention does not require the Level II map 204 to be retrieved; rather it is to be derived from the Level I map 202. More specifically, the channel value for each texel A, B, C, and D in Level II can be determined by averaging the channel values for the corresponding four texels 206 in Level I. Thus, the value for texel A in level II is given as:

$$v(A) = (v(A0) + v(A1) + v(A2) + v(A3))/4 \quad \text{(Eq. 9)}.$$

Thus, $$v_1(P) = v_2(P) = (v(A0) + v(A1) + v(A2) + v(A3))/4 \quad \text{(Eq. 10)}$$

and the two values are identical. In this specialized case, the trilinear interpolation between Levels I and II is trivial since the values for each level 202, 204 are identical.

Figure 6:
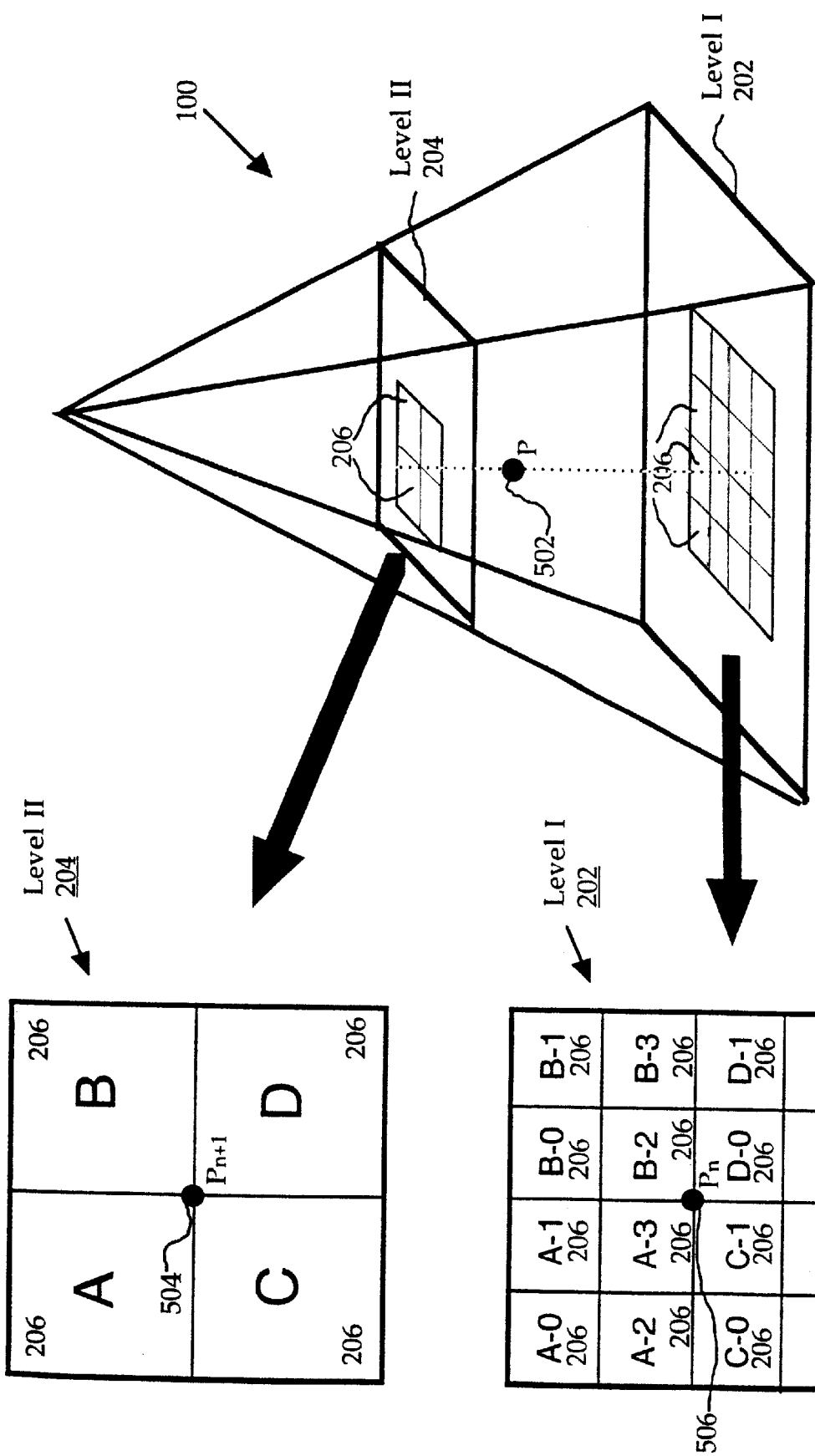

Referring now to FIG. 6, there is shown an example corresponding to FIG. 4B, wherein point P 502 lies at the intersection of four Level II texels 206. Here, as with FIG. 5, the selected level of detail is assumed to lie between two levels 202, 204, designated as Level I and Level II. Texture map portion 204 of Level II, shows point $P_{n+1}$ as lying at the intersection of four texels A, B, C, and D. Texture map portion 202 of Level I shows point $P_n$ as lying at the intersection of four texels 206, designated as A3, B2, C1, and D0.

Thus, the value for Level I is equal to the average of the four intersecting texels A3, B2, C1, and D0:

$$v_n(P_n) = (v(A3) + v(B2) + v(C1) + v(D0))/4 \quad \text{(Eq. 11)}$$

The value for Level II is equal to the average of the four intersecting texels A, B, C, and D (per Eq. 4 above):

$$v_{n+1}(P_{n+1}) = (v(A) + v(B) + v(C) + v(D))/4 \quad \text{(Eq. 12)}$$

In the present invention, Level II 204 is preferably derived from Level I, with the value for each texel A, B, C, and D being determined by averaging four Level I texels 206, so that:

$$v(A) = (v(A0) + v(A1) + v(A2) + v(A3))/4 \quad \text{(Eq. 13)}$$

$$v(B) = (v(B0) + v(B1) + v(B2) + v(B3))/4 \quad \text{(Eq. 14)}$$

$$v(C) = (v(C0) + v(C1) + v(C2) + v(C3))/4 \quad \text{(Eq. 15)}$$

$$v(D) = (v(D0) + v(D1) + v(D2) + v(D3))/4 \quad \text{(Eq. 16)}$$

Thus, substituting in Eq. 12:

$$v_{n+1}(P) = (v(A0) + v(A1) + v(A2) + v(A3) + v(B0) + v(B1) + v(B2) + v(B3)$$
$$+ v(C0) + v(C1) + v(C2) + v(C3) + v(D0) + v(D) + v(D2) + v(D3))/16 \,(\text{Eq. 17})$$

The Level II value is therefore the average of the sixteen Level I texels 206 nearest point $P_n$.

Once the Level I and II values are determined, interpolation between Levels I and II is performed as described above (Eq. 6).

Figure 7:
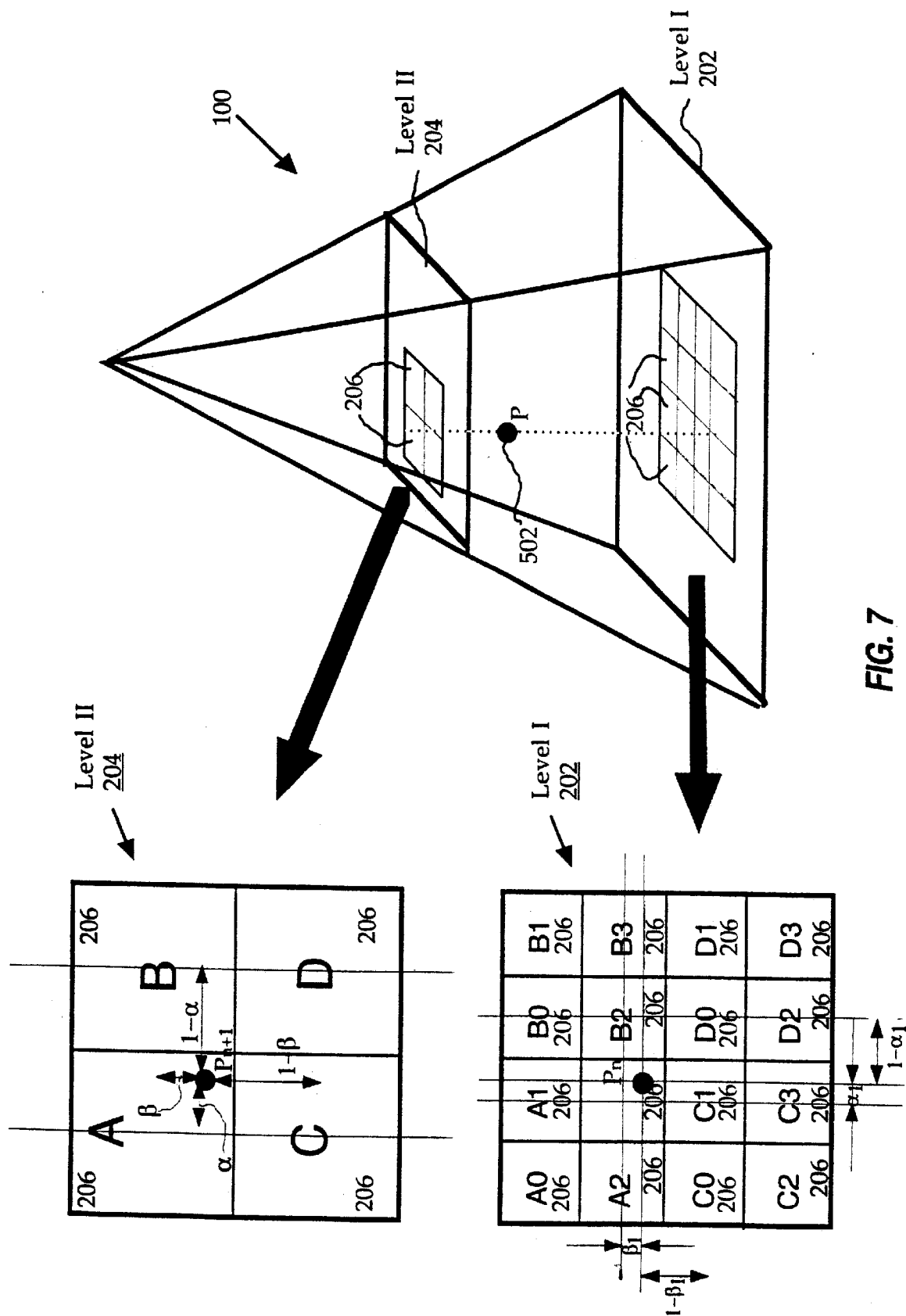

Referring now to FIG. 7, there is shown an example corresponding to FIG. 4C, wherein point P 502 lies at some arbitrary location. This is the general case, where weighted averaging is performed to interpolate within each level. In addition, as with FIG. 6, the selected level of detail is assumed to lie between two levels 202, 204, designated as Level I and Level II.

For Level II, the interpolation is performed as described above, so that the value at point $P_{n+1}$ is given as:

$$v_{n+1}(P_{n+1}) = \alpha(\beta v(D) + (1-\beta)v(B)) + (1-\alpha)(\beta v(C) + (1-\beta)v(A)) \quad \text{(Eq. 18)}$$

where $\alpha$ represents the horizontal distance between point $P_{n+1}$ and a line bisecting texels A and C, and $\beta$ represents the vertical distance between point $P_{n+1}$ and a line bisecting texels A and B, as shown in the top portion of FIG. 7. These distances are normalized so that the distance between center points of adjacent Level II texels 206 is given by the value 1.

As discussed above in connection with FIG. 6, the value for each Level II texel 206 A, B, C, and D is derived from four corresponding values from the Level I map 202.

For Level I, the value at point $P_n$ is interpolated from four Level I texels 206, as follows:

$$v_1(P_n)=\alpha_1(\beta_1 v(D0)+(1-\beta_1)v(B2)+(1-\alpha_1)(\beta_1 v(C1)+(1-\beta_1)v(A3)) \quad (19)$$

where $\alpha_1$ represents the horizontal distance between point $P_n$ and a line bisecting texels A3 and C1, and $\beta_1$ represents the vertical distance between point $P_n$ and a line bisecting texels A3 and B2, as shown in the bottom portion of FIG. 7. These distances are normalized so that the distance between center points of adjacent Level I texels 206 is given by the value 1.

Once the Level I and II values are determined, interpolation between Levels I and II is performed as described above (Eq. 6).

The example shown in FIG. 7 can be generalized to apply to any arbitrary point P. At each of two adjacent levels, four texel values are used to generate an interpolated channel value. The four texel values for the lower-resolution level (Level II in the example) are derived from corresponding texel values in the higher-resolution level by averaging. Once the two interpolated channel values are derived, they are combined by weighted averaging to derive a value for P at an arbitrary intermediate level.

Having now described the process of using a MIP map 100 in texture mapping, the present invention will now be described with particularity in FIGS. 8–14. First, the system 800 of the present invention will be described including the novel texture caching scheme of the present invention. In particular, the portion of system 800 allowing the present invention to generate channel values produced by texture mapping faster than the values can be read from memory will be shown and described. Second, the preferred methods for performing texture mapping by reading one texture map will be described.

System of the Present Invention

Figure 8:
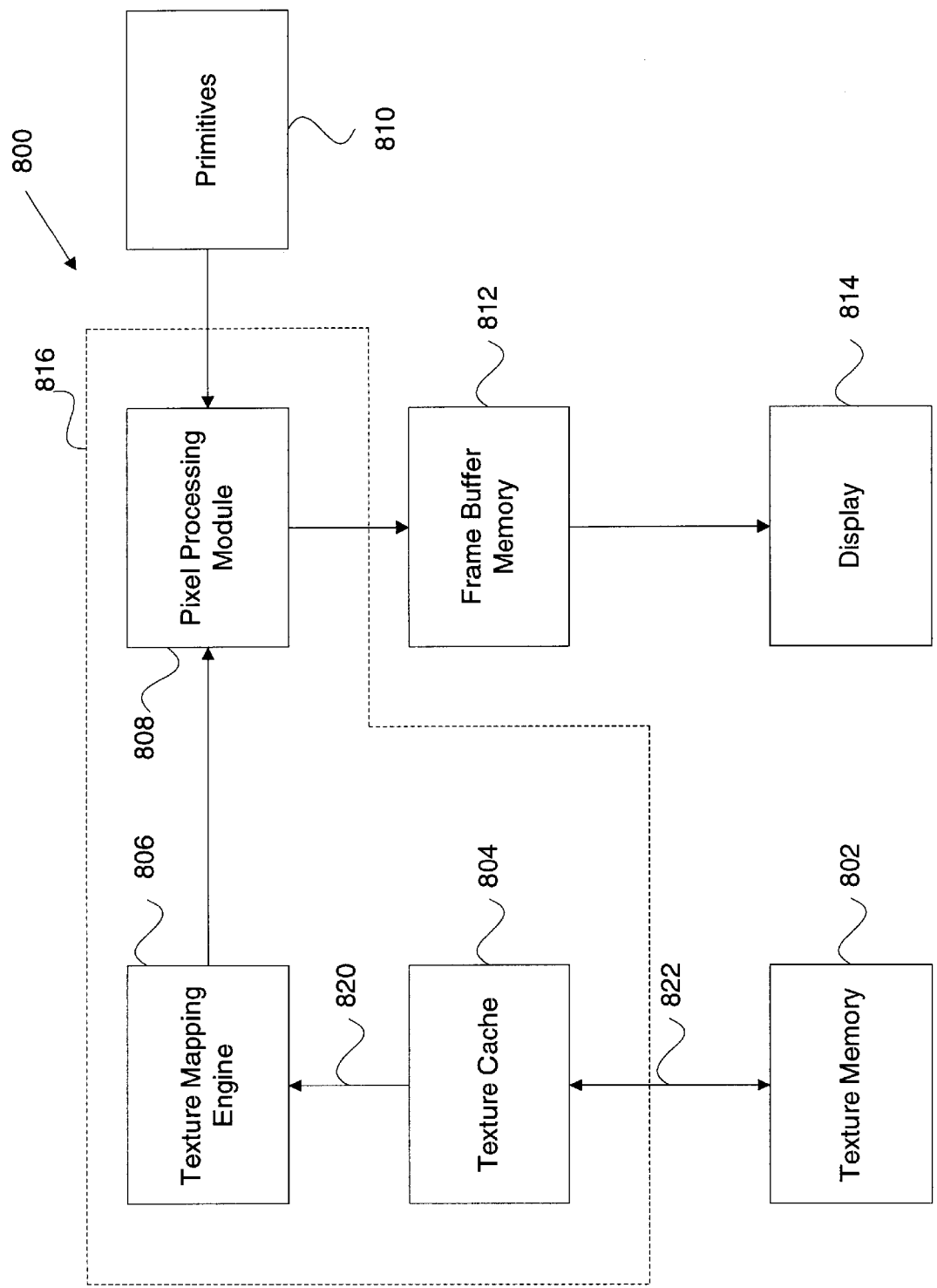
FIG. 8 is a block diagram of a graphics system for practicing the preferred embodiment of the present invention.

Referring now to FIG. 8, there is shown a block diagram of a system 800 for practicing the present invention. System 800 is typically implemented on a computer system such as a personal computer having an Intel Pentium™ processor, memory, non-volatile storage and running the Windows™ 95 operating system from Microsoft Corporation or any other similar operating system. Such a personal computer system may include graphics acceleration circuitry coupled to the processor including functionality similar to a conventional graphics chip such a ViRGE manufactured and sold by S3 Incorporated of Santa Clara, Calif. The system 800 preferably includes a texture memory 802, a texture cache 804, a texture mapping engine 806, a pixel processing module 808, a primitive memory 810, a frame buffer memory 812, and a display device 814. The portions typically integrated as a graphic acceleration chip include the components enclosed by the dotted lien and delineate as 816. Those skilled in the art will recognize that the system 800 may include other capabilities common for personal computers including but not limited to network interfaces and communications capabilities. The components of the system 800 are coupled in a conventional manner such as a Von Neuman architecture.

The texture memory 804 stores two-dimensional representations of a texture to be mapped onto primitives. As will be described in more detail below, in one embodiment, texture memory 804 stores the MIP map 100 having multiple representations of the texture, at varying levels of resolution. In alternative embodiments, only one representation is stored, and other representations are derived as needed. The texture memory 804 is preferably random access memory or an equivalent type of memory device capable of being written and read. The texture memory 804 is maintained under direction and control of the processor of the system 800.

The texture cache 804 provides temporary storage of portions of texture memory 802 for improved access speed. In accordance with the preferred embodiment, the texture cache 804 preferably stores at least a portion of one level of the MIP map 100. The data is preferably written into the texture cache 804 from the texture memory 802 in a conventional manner. However, the organization of the data in the texture cache 804 is unique to the present invention and helps preserve the memory locality for use with the preferred embodiment of the texture mapping engine 806 of the present invention. In particular, the texels are stored in the texture cache 804 in blocks of 8×8 texels. Each of the texels in the 8×8 block are stored according to a predefined scheme as will be described in more detail below with reference to FIGS. 9–11. The present invention is particularly advantageous because of the unique manner in which the texels of the texture map are stored in the texture cache 804. This is in addition to the other advantages of the present invention provided by the different ways to access the texel data, and the significant improvement of the present invention needing to access only a single level of texel data to compute intermediate value of the texel data. This allows the present invention to eliminate the need to read two levels of detail from the MIP map 100 in order perform texture mapping, and allows the generation of a texture color value from a single level of the texture map. This also reduces the memory access time, memory bandwidth and overall performance time for performing texture mapping.

The graphic primitives are preferably stored in a primitive storage portion of memory 810, and define the size and shape of graphic elements, such as triangles or other polygons, to be displayed. This done in a conventional manner such as having the primitives stored as a part of system memory or in an off screen potion of the frame buffer memory 812.

The texture-mapping engine 806 performs the operation of mapping textures stored in texture memory 802 onto primitives 202 from the primitive storage memory 810. As noted above, with the present invention, the lower-resolution level is derived from the higher-resolution level, obviating the need to perform additional memory reads to retrieve the lower-resolution level. The texture-mapping engine 806 preferably includes specially configured hardware to optimize the generation of a texture color value using a texture source. The preferred embodiment for the texture-mapping engine 806 is shown in more detail below with reference to FIGS. 12–14. The output of the texture-mapping engine 806 is preferably coupled to an input to the pixel-processing module 105.

The pixel-processing module 105 performs z-buffering, texture lighting, fogging, alpha blending, and other pixel operations and writes the resulting rendered image to frame buffer memory 812 or other video memory. This is preferably done in a conventional manner using the output of the texture mapping engine 806 and the primitives from the primitive storage memory 810 as well as other control signals from the processor of the system 800.

The image in frame buffer memory 812 is sent to display device 814 in a conventional manner. The display device 814 is typically a cathode-ray tube, but may be based on some other form of display technology such as LCD panel. The present invention relates primarily to the operation of texture mapping engine 806 and in particular its retrieval and processing of stored texture maps from texture memory 802 and texture cache 804, therefore, the texture cache 804 and the texture mapping engine 806 will be described in more detail.

Figure 9:
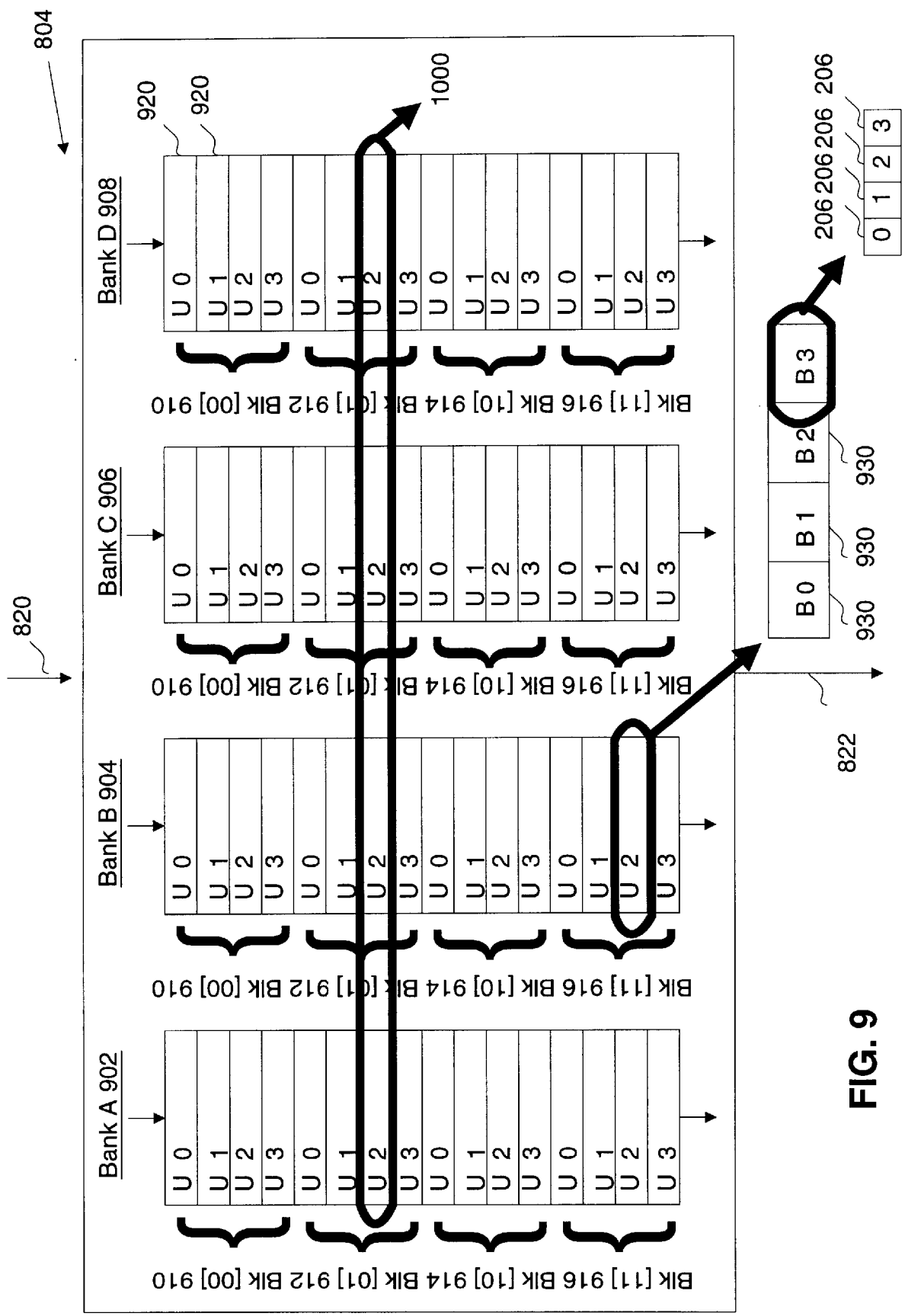
FIG. 9 is a block diagram of a preferred embodiment for the texture cache according to the present invention.

Referring now to FIG. 9, a block diagram of a preferred embodiment for the texture cache 804 is shown. The texture cache 804 has an input port or write port coupled to line 820 for receiving texels from the texture memory 802. The texture cache 804 also has an output port or read port coupled to line 822 to provide pixels to the texture-mapping engine 806. The texture cache 102 also includes read/write control and address lines (not shown) for storing data to and reading data from the texture cache 804 that operate in a conventional manner as will be understood by those skilled in the art.

The texture cache 804 is preferably organized into a plurality of banks 902, 904, 906, 908. Each bank 902, 904, 906, 908 includes channel data for 256 texels. In particular, the texture cache 804 preferably has four banks 902, 904, 906, 908 denoted as banks A, B, C, D. Each of the banks 902, 904, 906, 908 in turn is preferably divided into sixteen units 920. The units 920 for each bank 902, 904, 906, 908 are denoted in four groups of four as units U0–U3. Furthermore, each unit 920 is comprised of four cells delineated by the bank number and a cell number. For example, unit U2 of block 11 916 of bank B is shown in more detail as having four cells 930 denoted as B0, B1, B2, B3. Finally, each of the cells 930 is comprised of four texels 206 as shown by the example B3 that includes texels 0, 1, 2, and 3. The present invention also organizes groups of units 920 in two ways. First, groups of sixteen units 902 extend across bank boundaries to defined blocks 910, 912, 914, 916 and denoted blk or block 00, 01, 10, 11. Alternatively, each bank 902, 904, 906, 908 can be considered to be divided into four blocks denoted 00, 01, 10, and 11. Thus, there are four blocks designated "00" (one for each bank 902, 904, 906, 908), four designated "01", four designated "10", and four designated "11". Each of the blocks 910, 912, 914, 916 includes sixteen units 920 that span across the four banks A 902, B 904, C 906, D 908 with four units U0–U3 920 in each bank 902, 904, 906, 908. Second, a single row 1000 of units 920 with one unit 920 from each bank A 902, B 904, C 906, D 908 forms an eight by eight texel block of the MIP map 100.

For illustrative purposes, three bytes in each texel 422 are used to represent, for example, eight-bit color values for red, green, and blue. Since each texel 206 includes three bytes (3), and since there are four texels per cell 930 (x4), four cells 930 per unit 920 (x4), sixteen units per bank (x16) and four banks A 902, B 904, C 906, D 908; the texture cache 804 is preferably about 3 kilobytes (24 kilobits). Thus, the texture cache 804 is capable of holding a total of 1024 texels, and this an exemplary size of a MIP map 100. Those skilled in the art will recognize that the texture cache 804 may be designed with the teachings of the present invention yet having a variety of other sizes.

Figure 10:
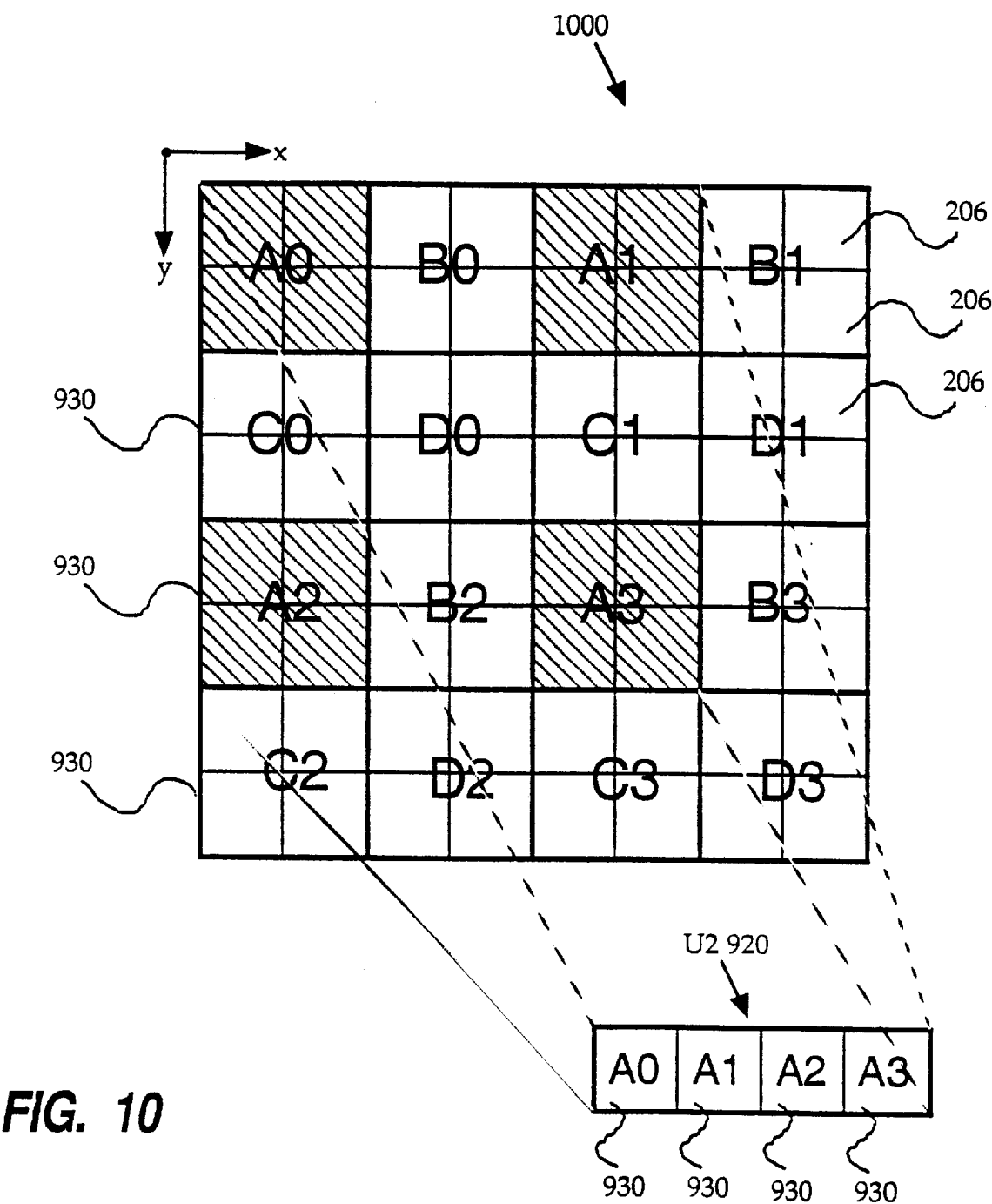
FIG. 10 is diagram showing the relationship between the texture map and the banks, units and cells of texture cache.

Referring also now to FIG. 10, the relationship of the texture map 102 to the physical locations of the data as it is stored as units 920, cells 930 and texels 206 will be described in more detail. FIG. 10 shown a portion 1000 of a texture map 102 that corresponds to data that is store in a row 1000 of units 920. This is the preferred storage of the texels 206 in an eight by eight texel cache block with groups of the pixel distributed between the four banks 902, 904, 906, 908 of the texture cache 804. As shown in FIG. 10, the present invention preferably stores the data in groups of four neighboring texels 206 in each cell 930. More specifically each cell 930 is 2x2 texel area as shown. The cells 930 from each unit 920 are distributed over the eight by eight texel cache block such that each quarter of the eight by eight texel cache block has a cell 930 from each bank 902, 904, 906, 908. The texels forming any cell 903 can be defined using x as an index to texels 206 in the horizontal direction and y as an index to texels 206 in the vertical direction. The four texels 206 included in any cell (A0, A1, A2 or A3) 930 of bank A 902 are defined as (4x, 4y), (4x+1, 4y), (4x, 4y+1), (4x+1, 4y+1). Similarly, the texels 206 forming any cell (B0, B1, B2 or B3) 930 in bank B 904 are defined as (4x+2, 4y), (4x+3, 4y), (4x+2, 4y+1), (4x+3, 4y+1). Likewise, the texels 206 forming any cell (C0, C1, C2, or C3) 930 in bank C 906 are defined as (4x, 4y+2), (4x+1, 4y+2), (4x, 4y+3), (4x+1, 4y+3). Finally, the texels 206 forming any cell (D0, D1, D2, or D3) in bank D 908 are defined as (4x+2, 4y+2), (4x+3, 4y+2), (4x+2, 4y+3), (4x+3, 4y+3). These indices can be used both in writing the texels to the cache 804 and in reading the texels 206 from the cache to determine their position in the texture map. The correspondence between the locations of the cells A0, A1, A2, A3 and their formation as unit U2 902 is also shown in FIG. 10. This feature of distribution of the data across the four bank 902, 904, 906, 908 of the texture cache 804 and the level of granularity provided by each cell 930 relative to the banks 902, 904, 906, 908 ensures that locality between levels of detail in a mapping function will be maximized, and therefore, memory accesses for any mapping calculation can be reduced to a single read operation. In other words, for a particular level of detail the neighboring four texels 206 are in a single cell 930 or at most in four cells 930, which due to the organization of the texture cache 804 of the present invention are locally organized to be accessed in a single block. The neighboring 16 texels that may be needed for calculation of the next level of detail similarly are likely in a single block of four cells 930 with one cell 930 in each bank 902, 904, 906, 908 or at most four blocks as will be discussed below. Those skilled in the are will recognized that the present invention advantageously organizes the texels 206 such that the texel level provides a first level of detail and the cell level provide a second level of detail that is one integer level higher that the first level.

Figure 11C:
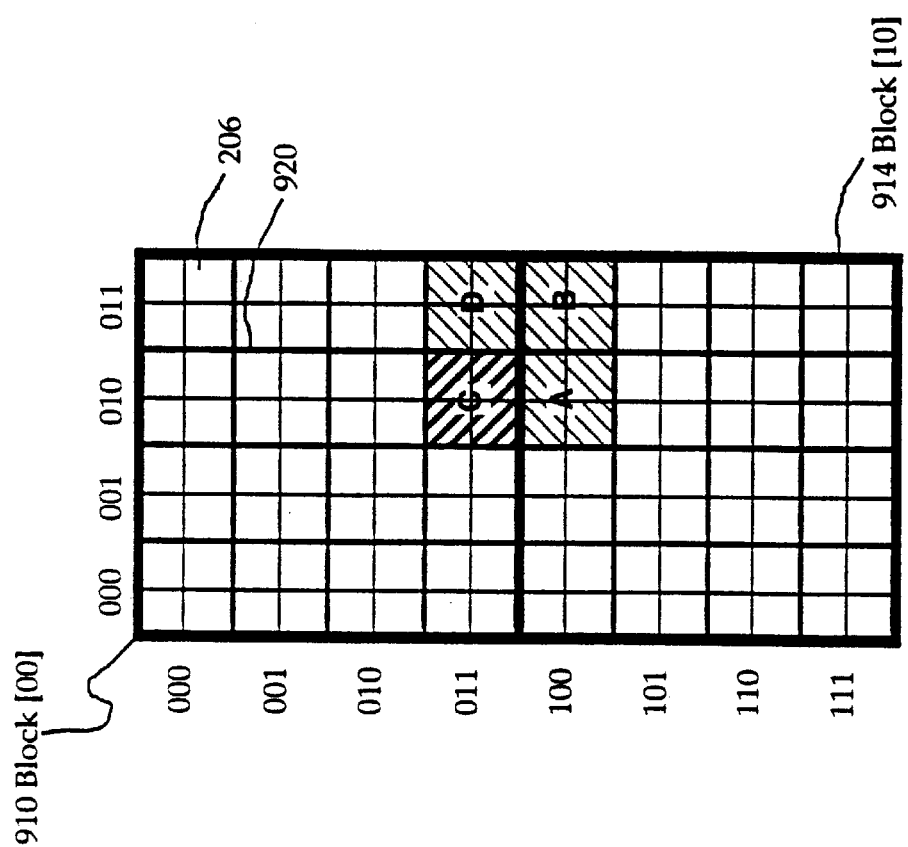

Referring now to FIGS. 11A–11D, the addressing scheme used for the texture cache 804 of the present invention will be described. FIG. 11A is a diagram representing a portion of the MIP map 100 and thus a portion of the texture cache 804. The portion shown is part of four blocks 912, 914, 916, 918 of the texture cache 804. Each square shown in FIG. 11A represents a cell 930. The cells 930 are identified by reference to their block 912, 914, 916, 918, their unit 902, and their cell 930. The present invention advantageously provides addressing on a cell by cell basis. The addressing of the texture cache 804 has two components: 1) a cell address and 2) a block read mask. The cell address in one embodiment is a six-bit cell address. For example, the six-bit cell address could be 3 bits of a first value (u) and 3 bits of a second value(v). Three bits are used for each coordinate axis allowing individual addressing for all cells in the 8×8 grid of cells that span the four blocks 912, 914, 916, 918. The cell address is preferably the address of upper left-most cell 930 in a group of 2×2 cells 930. For example, a cell address of 010010 would include the cells U0–A3, U0–B3, U0–C3, U0–D3 of block 00 910. The other portion of an address is a BlockReadMask. The BlockReadMask is preferably a 4-bit value with one bit corresponding to each block 912, 914, 916, 918 that needs to be read to perform the mapping. For example, the first bit corresponds to block 00 910, the second bit to block 01 912, the third bit to block 10

914, and the fourth bit to block 11 916. The BlockReadMask is used to select the blocks 912, 914, 916, 918 that should be read from texture cache 804, and that will be described in more detail with reference to FIGS. 12B–12D.

Figure 11B:
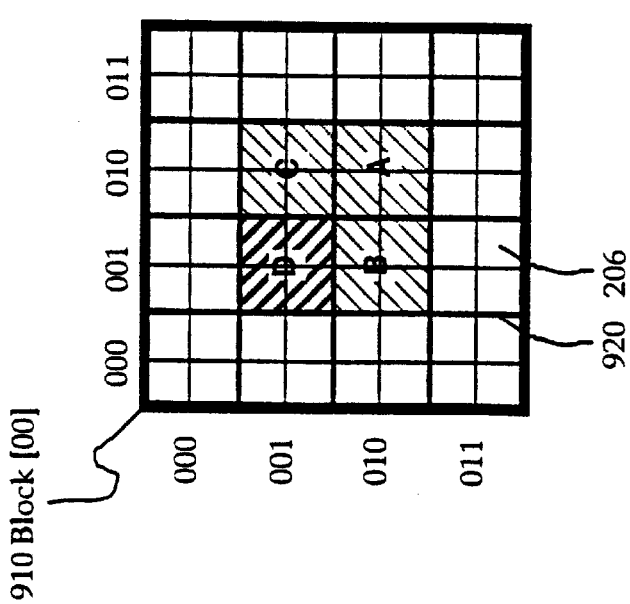

Referring now to FIG. 11B, there is shown an example of a read requiring only one block 910, block 00, to be read. The cell address is given by the six-bit value 001000 and the BlockReadMask is given by the value 1000 (assuming the bit positions, MSB to LSB, in the BlockReadMask represent blocks 00, 01, 10, and 11 in that order). It should be noted that the order of the banks 902, 904, 906, 908 from left to right and top to bottom is D, C, B, and A.

Referring now to FIG. 11C, there is shown an example of a read requiring two blocks 910, 912, block 00 and block 10. The cell address is 010011 and the BlockReadMask is 1010. It should be noted that the order of the banks 902, 904, 906, 908 from left to right and top to bottom is C, D, A, and B. As compared with the access of FIG. 11B, the order is different, yet the present invention continues to use one cell from each bank to again return the 16 neighboring texel 206.

Figure 11D:
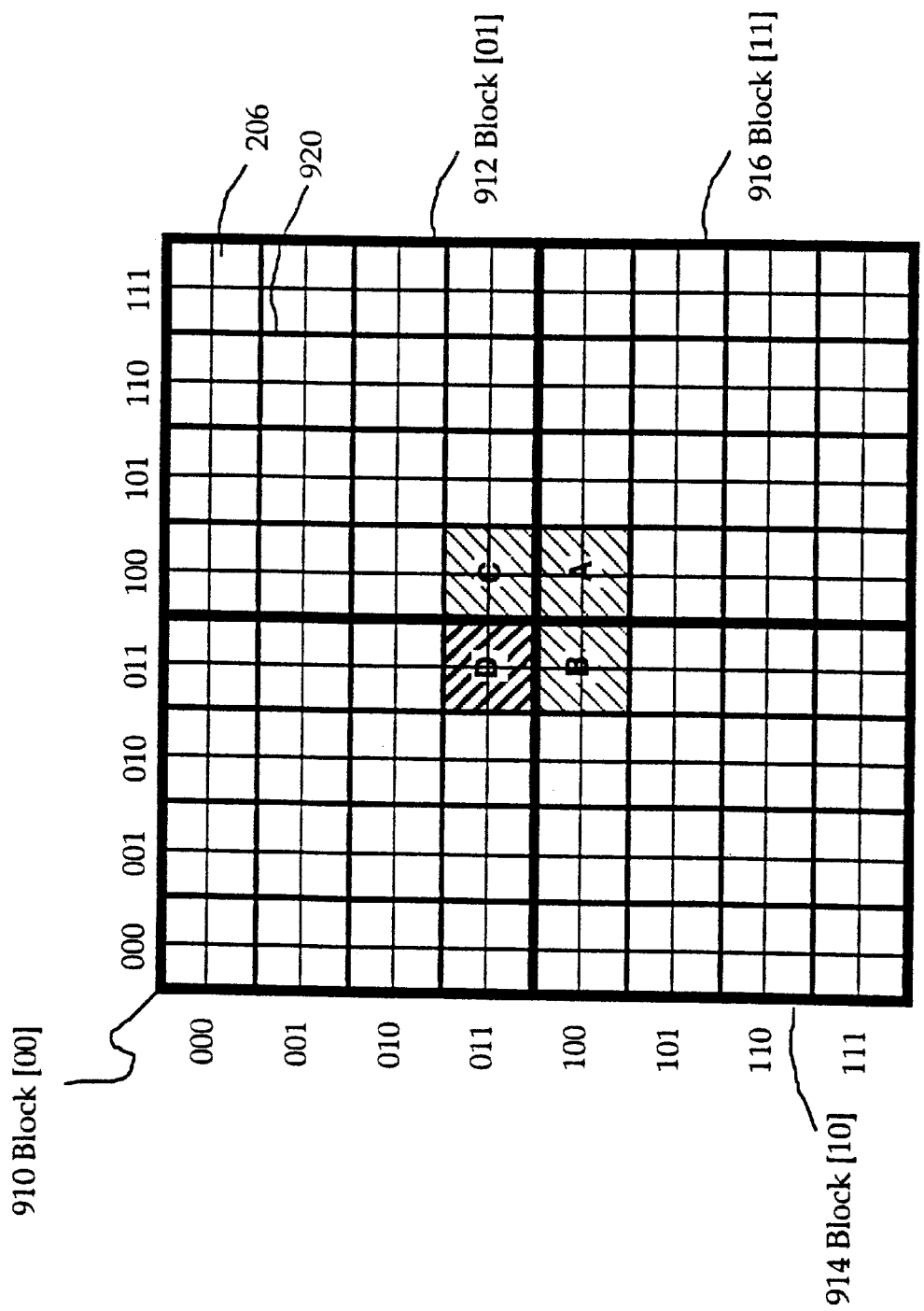

Finally, FIG. 11D shows an example requiring four blocks 910, 912, 914, 196, block 00, 01, 10, 11. The cell address is 011011 and the BlockReadMask is 1111.

Figure 12:
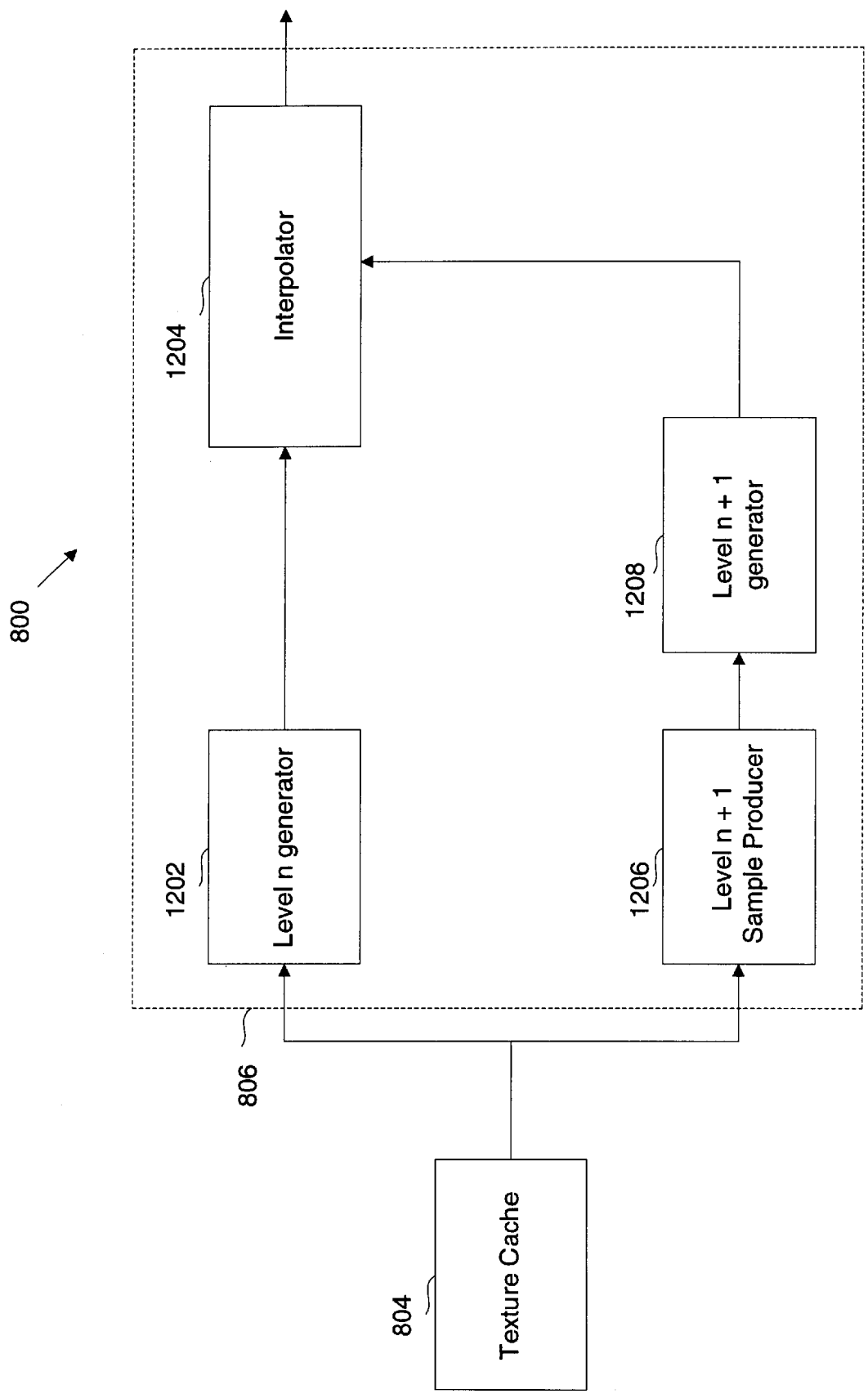
FIG. 12 is a block diagram showing the texture cache and a preferred embodiment of the texture-mapping engine in more detail.

Having now described the organization and operation of the texture cache 804, a preferred embodiment for the texture-mapping engine 806 will be described. As shown in FIG. 12, the texture-mapping engine 806 preferably comprises a first level generator 1202, an interpolator 1204, a sample producer 1206 and a second level generator 1208. As has been noted above, the present invention advantageously requires only a single read operation to perform texture mapping. The present invention retrieves a neighborhood of 16 texels 206 and uses a portion of them to determine a value for a first level of detail, and all 16 of texels 206 to determine a value for a second level of detail. The present invention then interpolates between the two levels of detail according to a provided fractional level of detail value.

As shown in FIG. 12, the first level generator 1202 is coupled to the texture cache 804, and generates a first level of detail n. For example, the level of detail n may be Level I as has been described above as FIGS. 1–7. The first level n generator 1202 receives 16 texels 206 from the texture cache 804. The first level n generator 1202 identifies and selects the four texels 206 closest to a given point P and generates a channel value for the level n level of detail. The first level n generator 1202 outputs the channel value(s). The output of the first level n generator 1202 is coupled to a first input of the interpolator 1204 for providing the generated channel value(s). The first level n generator 1202 is described below with reference to FIG. 13 in more detail.

The sample producer 1206 similarly has an input and an output. The input of the sample producer 1206 is coupled to the texture cache 804 to receive 16 texels 206. The sample producer 1206 generates the texels for the next level of detail, Level II or n+1, using the input the 16 texels. In the preferred embodiment this is performed using the four texels 206 comprising each cell and averaging them to from the texel value for the next higher level of detail. The output of the sample producer 1206 is coupled to an input of the second level n+1 generator 1208. The second level n+1 generator 1208 uses the input four texel values 206 to generate the level of detail for level n+1. The output of the second level n+1 generator 1208 is coupled to the input of a second input of the interpolator 1204 for providing the generated channel value(s) for level n+1. The sample producer 1206 and the interpolator 1204 will be described in more detail below with reference to FIG. 14.

Finally, the interpolator 1204 generates the final texture color value from the color value provided by the first level n generator 1202, the color value provided by the second level n+1 generator 1208 and the fractional value (fd) of the level of detail. While not shown in FIG. 12 for ease of understanding and simplicity, those skilled in the art will realize that a signal representing a fractional value for the level of detail is also received by the interpolator 1204, and the interpolator 1204 uses the fractional value to perform a weighted average between the color values provided by the first level n generator 1202 and the second level n+1 generator 1208. For example, the interpolator 1204 preferably implements the equation $$v_d = (1-fd)(v_{id}) + fd(v_{id+1}) \quad \text{(Eq. 6)}$$

where $v_{id}$ is the value output by the first level n generator 1202 and $v_{id+1}$ is the value output by the second level n+1 generator 1208.

Figure 13:
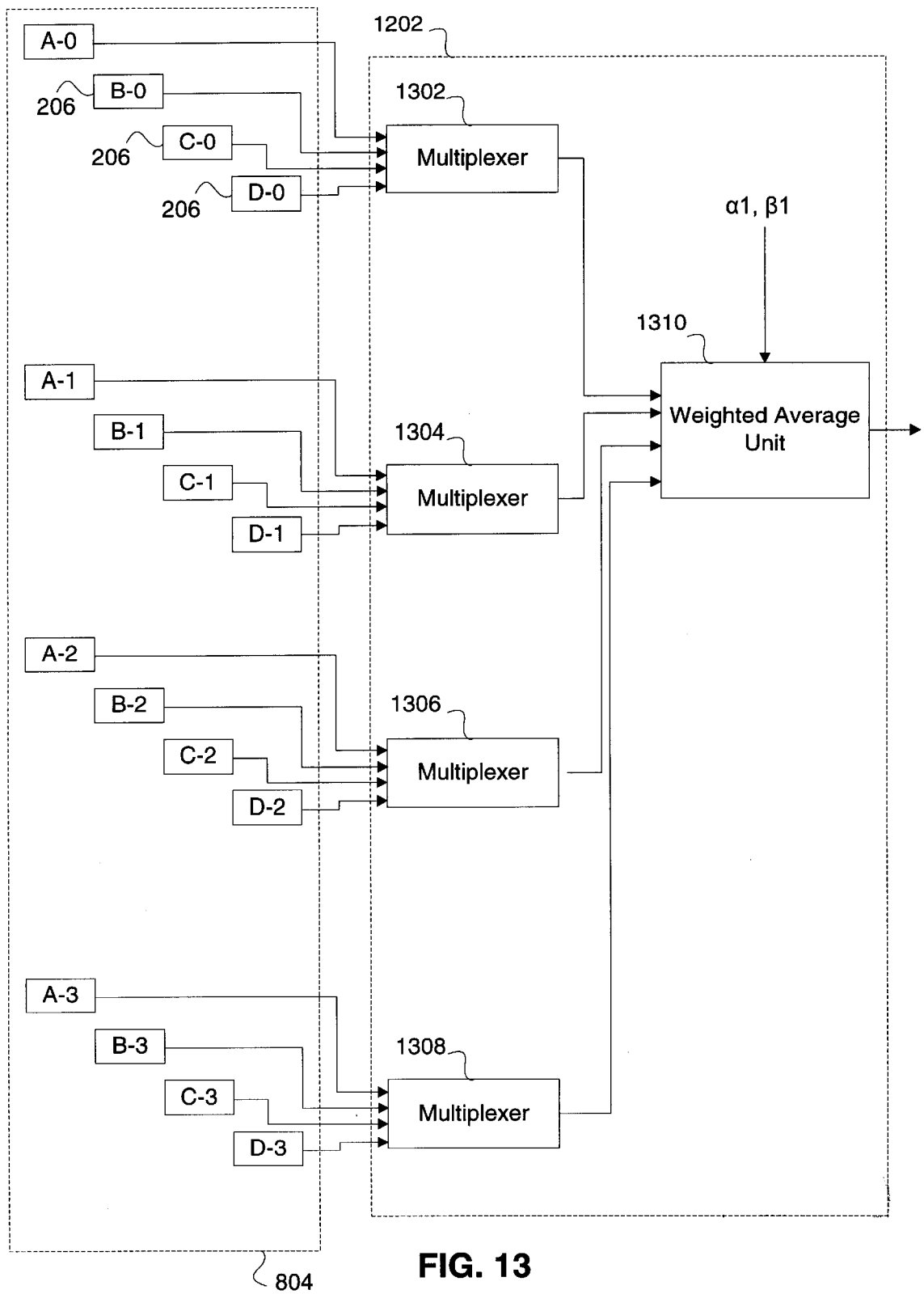
FIG. 13 is a block diagram showing a preferred embodiment of the level n generator of the texture-mapping engine.

Referring now to FIG. 13, a block diagram of the preferred embodiment of the level n generator 1202 is shown. The input of the level n generator 1202 is coupled to the output of the texture cache 804. The level n generator 1202 preferably has sixteen inputs, each input coupled to receive a texel 206 from the texture cache 804. The notation used for the texels 206 is the same as used in FIGS. 5 and 6 where a letter designates the bank 902, 904, 906, 908 and the number indicate the texel 206 within the cell 930. A "-" is used to separate the bank designation from the texel designation so that this notation is not confused with the cell designations of FIGS. 9–11. In one embodiment, the level n generator 1202 comprises a plurality of multiplexers 1302, 1304, 1306, 1308, and a weighted average unit 1310. Each of the multiplexers 1302, 1304, 1306, 1308, is coupled to receive a respective texel 206 from each bank 902, 904, 906, 908. For example, a first multiplexer 1302 has each of four inputs coupled to a respective "0" position texel 206 from each bank 902, 904, 906, 908. Similarly, the second multiplexer 1304 has each of four inputs coupled to a respective "1" position texel 206, the third multiplexer 1306 has each of four inputs coupled to a respective "2" position texel 206, and the fourth multiplexer 1308 has each of four inputs coupled to a respective "3" position texel 206. Since the texels 206 are grouped in the texture cache 804 in 2×2 blocks, the multiplexers 1302, 1304, 1306, 1308, in combination are able to output any of the nine possible combinations of four texels (one with each position) that are closest to a point P in the neighborhood of the sixteen pixels (4×4 area). While not shown, those skilled in the art will recognize that each of the multiplexers 1302, 1304, 1306, 1308 receives a two bit value indicating which of the four inputs are to be provide at the multiplexer's output. The output for each of the multiplexers 1302, 1304, 1306, 1308 is coupled to a respective input of the weighted average unit 1310. The weighted average unit 1310 is also coupled to receive the fractional values $\alpha_1$ and $\beta_1$, such from a system processor. In this exemplary embodiment, the weighted average unit 1301 preferably implements the equation:

$$v_1(P_n) = \alpha_1(\beta_1 v(0) + (1-\beta_1)v(2)) + (1-\alpha_1)(\beta_1 v(1) + (1-\beta_1)v(3)) \quad \text{(Eq. 9) modified}$$

where v(0) is output by the first multiplexer 1302, v(1) output by the second multiplexer 1304, v(2) is output by the third multiplexer 1306, v(3) is output by the fourth multiplexer 1308. Such an implement for the weighted average unit 1310 will be understood from the above equation by those skilled in the art.

Figure 14:
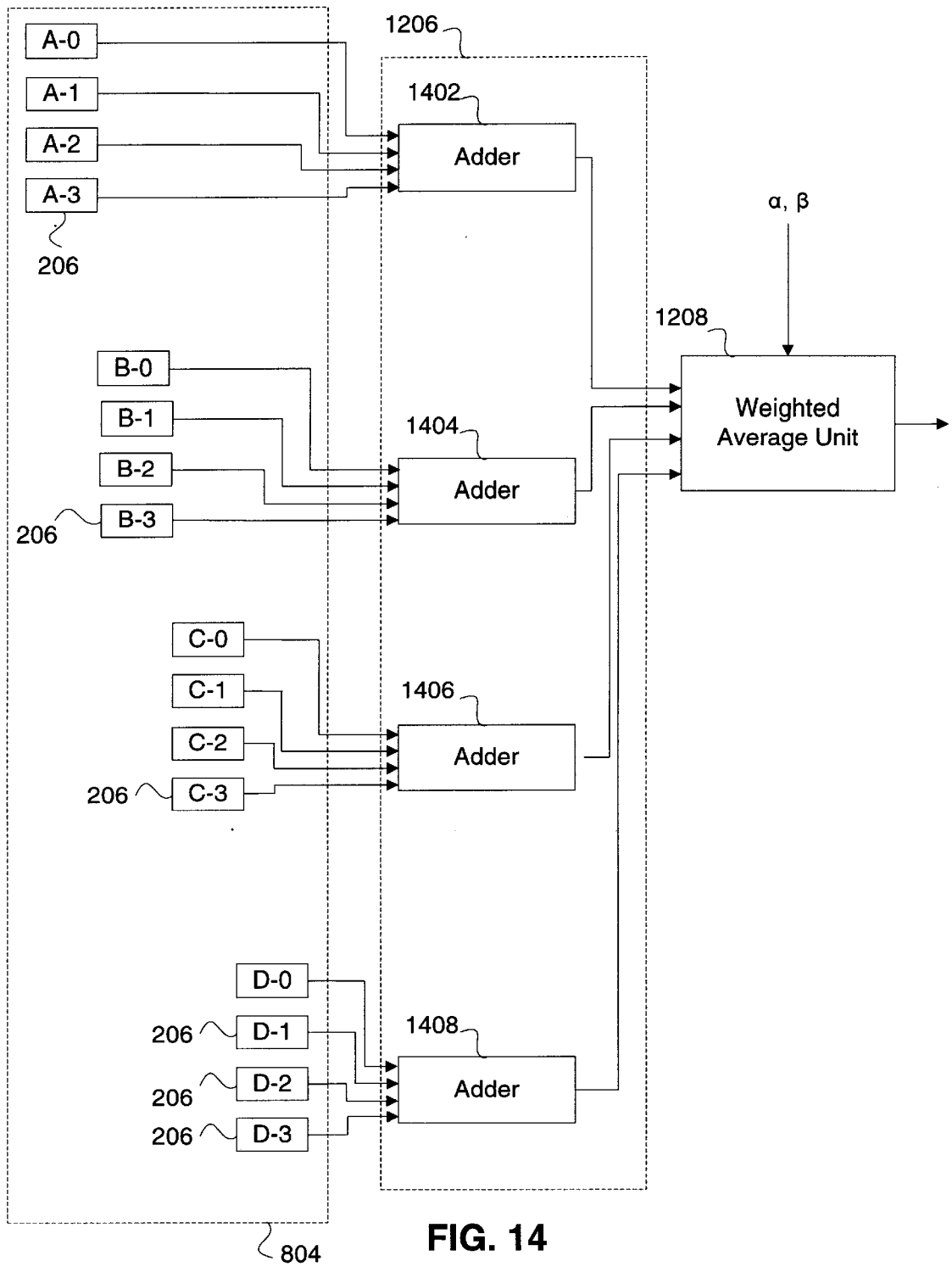
FIG. 14 is a block diagram showing a preferred embodiment of the level n+1 sample producer of the texture-mapping engine.

FIG. 14 shows a block diagram of a preferred embodiment of the level n+1 sample producer 1206 and the second weighted average unit 1208 of the texture-mapping engine 806. Again, the notation used for the texels 206 is the same as used in FIG. 13 where a letter designates the bank 902, 904, 906, 908 and the number indicate the texel 206 within the cell 930. A "-" is used to separate the bank designation from the texel designation so that this notation is not confused with the cell designations of FIGS. 9–11. Sample producer 1206 generates values for the next higher integer level of detail using the retrieved area of 4×4 texels 206. In one embodiment of the present invention is performed using bilinear interpolation. Those skilled in the art will recognize that other types of interpolation may be used and that the sample producer 1206 coupled be modified accordingly. The sample producer 1206 preferably has sixteen inputs, each input coupled to receive a texel 206 from the texture cache 804. The sample producer 1206 preferably comprises a plurality of adders 1402, 1404, 1406, and 1408. Each of the adders 1402, 1404, 1406, 1408 is preferably coupled to receive data for four texels 206. The texels 206 are preferably from the same cell 930, and thus, from a 2×2 texel area of the MIP map 100. As shown in FIG. 14, the first adder 1402 has four inputs, each of which is coupled to a respective texel 206 from a cell 930 from bank A 902. Similarly, the second adder 1404 has four inputs, each of which is coupled to a respective texel 206 from a cell 930 from bank B 904. The third and fourth adders 1406, 1408 are likewise coupled to banks C 906 and D908. Each of the adders 1402, 1404, 1406 and 1408 are used to generate a texel value for the Level II texels. The output of each adders 1402, 1404, 1406, 1408 collectively form the output of the sample producer 1206 and are coupled to respective inputs of the second weighted average unit 1208. The second weighted average unit 1208 also has an input for receiving the fractional values α and β. In this exemplary embodiment, the second weighted average unit 1208 preferably implements the equation:

$$v_{n+1}(P_{n+1})=\alpha(\beta v(D)+(1-\beta)v(B))+(1-\alpha)(\beta v(C)+(1-\beta)v(A)) \quad \text{(Eq. 18)}$$

where v(A) is output by the first adder 1402, v(B) is output by the second adder 1404, v(C) is output by the third adder 1406, and v(D) is output by the fourth adder 1408.

The above-described hardware implementation is merely one exemplary embodiment of the present invention. Other architectures, having different numbers of types of banks, blocks, texels, and other features, may be used.

Method of the Present Invention

Figure 15:
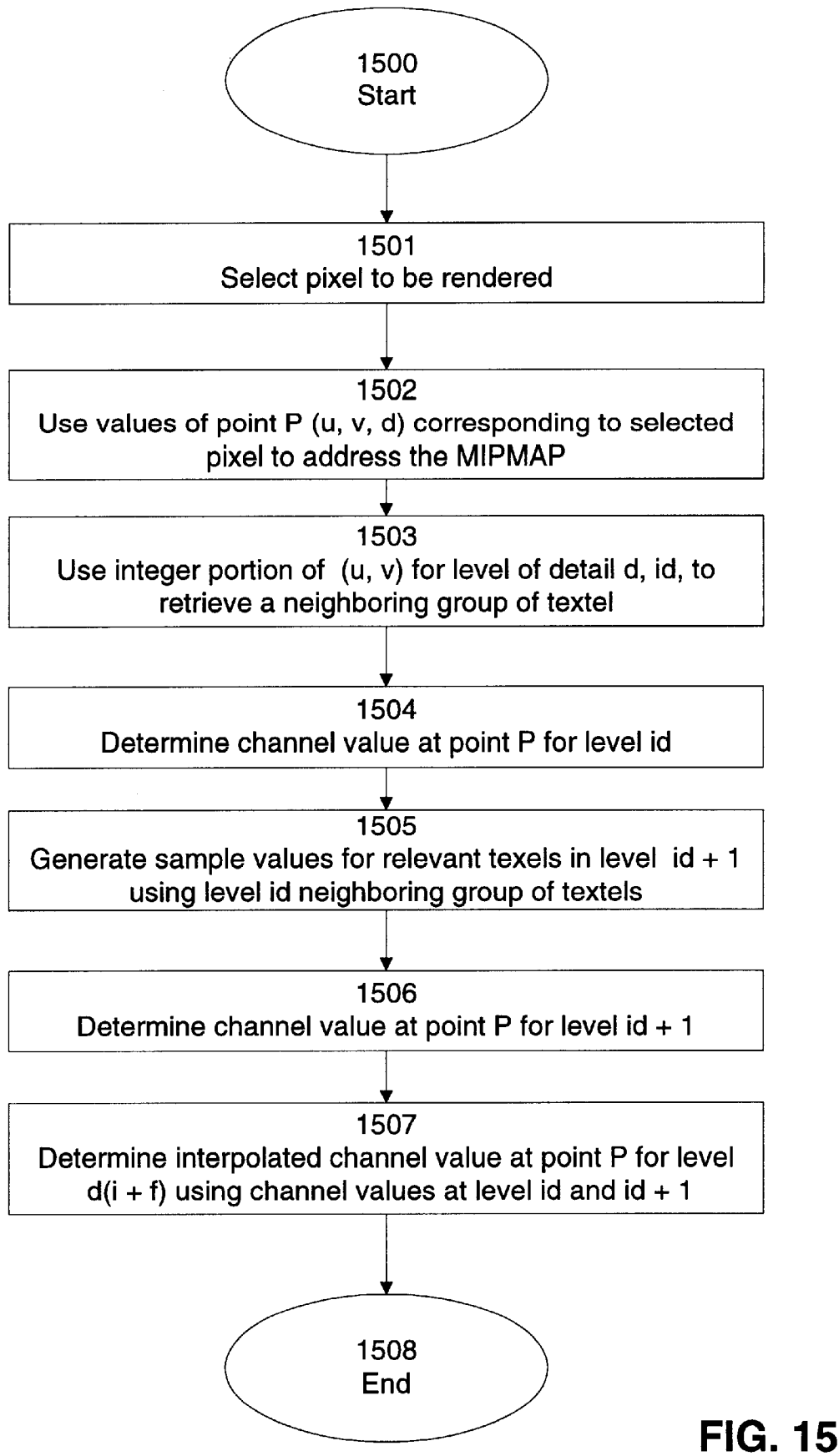
FIG. 15 is a flowchart showing a first embodiment of a method for performing texture mapping according to the present invention.

Referring now to FIG. 15, a flowchart of a first embodiment of the overall operation of the present invention is shown. The steps of FIG. 15 are performed for each pixel being rendered in a given primitive, though in some embodiments, the steps are performed in parallel and several pixels may be processed simultaneously or consecutively. The preferred process begins in step 1501 by selecting a pixel indicated by a point P to be rendered on the display device 814. This will be done by the texture-mapping engine 806 in response to control signals from the system processor. Next in step 1502, the method of the present invention uses values of point P (u, v, d) corresponding to the selected pixel to address the texture cache 804. As noted above, each of the values of point P (u, v, d) include and integer portion and a fractional portion(s). Then in step 1503, the integer values of (u, v) for point P are used to retrieve a neighboring group of pixels (e.g., 4×4) for the level id where id is the integer portion of the level of detail, d. Next in step 1504, the method determines a level I channel value for the projection of point P on level id. This is preferably performed by bilinearly interpolating a value for the projection of point P on level id from the closed 2×2 neighborhood of texels 206. Then in step 1505, the method generates four texel values or samples for level of detail id+1 using a neighboring group of 16 level id texels 206. The 16 level id texels 206 are preferably in a 4×4 texel neighborhood. Averaging areas of 2×2 texels preferably generates the four samples. Then in step 1506, the method determines a level II channel value for the projection of point P on level id+1. This is preferably performed by bilinearly interpolating a value for the projection of point P on level id+1 from the four sample values or texels 206 generated in step 1505. Finally, the present invention generates the texture color value by interpolating between the channel value for level I generated in step 1504 and the channel value for level II generated in step 1506 using the fractional portion of fd of the level of detail.

Figure 16:
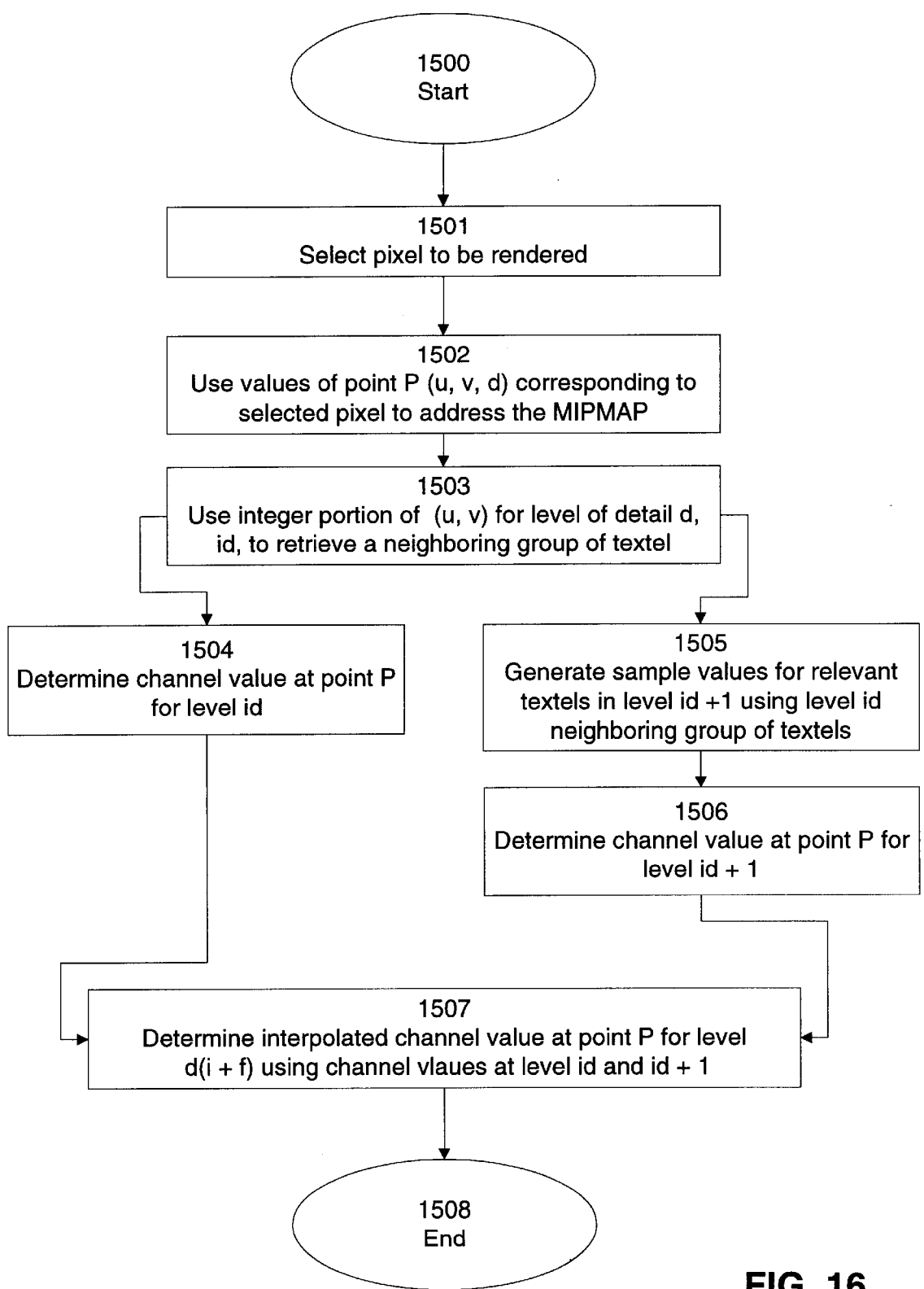
FIG. 16 is a flowchart showing a second and preferred embodiment of the method for performing texture mapping according to the present invention.

Referring now to FIG. 16, a second and preferred embodiment of the present invention is shown. In this second embodiment like reference numbers have been used for like steps from FIG. 15. In the second embodiment, performing step 1504 in parallel with steps 1505 and 1506 optimizes performance. Thus, the determination of the color values can be performed at the same time using the single read operation that stored the relevant group of 16 texels 206 in the texture cache 804.

From the above description, it will be apparent that the invention disclosed herein provides a novel and advantageous system and method of implementing trilinear texture filtering with an optimized memory access scheme. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention and example figures are intended to be illustrative, but not limiting, of the scope of the invention, which is set forth in the following claims.

What is claimed is:

1. In a graphics system using a multum in parvo (MIP) map, a method of texture mapping a primitive, comprising:
   identifying a pixel for performing texture mapping, the pixel identified by values (u, v, d), one of which (d) is a level of detail, in the MIP map;
   selecting a first, relatively higher resolution level using a level of detail, d, for the pixel;
   selecting a second, relatively lower resolution level using the level of detail, d for the pixel;
   retrieving from the MIP map first level texel data corresponding to the first resolution level;
   generating second level texel data corresponding to the second resolution level from the retrieved first level texel data;
   using trilinear texture filtering, generating interpolated texel data for the pixel from the retrieved first level texel data and the generated second level texel data.

2. The method of claim 1, wherein the level of detail, d, includes an integer portion, id, and a fractional portion, fd, and the step of selecting the first resolution level is done selecting a level of detail equal to the integer portion of the level of detail, id.

3. The method of claim 1, wherein the level of detail, d, includes an integer portion, id, and a fractional portion,fd, and the step of selecting the second resolution level is done selecting a level of detail equal to the integer portion of the level of detail plus 1, id+1.

4. The method of claim 1, wherein the first level texel data comprises a plurality of first level texel values; and wherein the step of generating second level texel data comprises averaging at least two adjacent first level texel values to derive a second level texel value.

5. The method of claim 4, wherein the first level texel data comprises sixteen texels from a 4×4 texel neighborhood of the MIP map for the level of detail matching an integer portion of d; and wherein the step of generating second level texel data comprises averaging groups of four texels in 2×2 texel areas to form four second level texel values.

6. The method of claim 1, wherein the retrieving from the MIP map first level texel data comprises the step of retrieving sixteen first level texels from a 4×4 texel neighborhood.

7. The method of claim 1, wherein the primitive contains at least one pixel having coordinates, and wherein the step of generating interpolated texel data comprises:
  determining a texture map location corresponding to the coordinates of the pixel;
  selecting a first level texel corresponding to the texture map location from the retrieved first level texel data;
  selecting a second level texel corresponding to the texture map location from the derived second level texel data; and
  performing weighted averaging between the selected first level texel and the selected second level texel to derive interpolated texel data.

8. The method of claim 1, wherein the primitive contains at least one pixel having coordinates, and wherein step of generating interpolated texel data comprises:
  determining a texture map location corresponding to the coordinates of the pixel;
  selecting at least two adjacent first level texels responsive to the texture map location from the retrieved first level texel data;
  performing bilinear interpolation using the selected first level texels to determine a first level channel value;
  selecting a second level texel corresponding to the texture map location from the derived second level texel data;
  performing weighted averaging between the first level channel value and a second level channel value produced from the second level texel to derive interpolated texel data.

9. The method of claim 1, wherein the primitive contains at least one pixel having coordinates, and wherein the step of generating interpolated texel data comprises:
  determining a texture map location corresponding to the coordinates of the pixel;
  selecting at least two adjacent first level texels according to the texture map location;
  performing bilinear interpolation using the selected first level texels to determine a first level channel value;
  selecting at least two adjacent second level texels according to the texture map location;
  performing bilinear interpolation using the selected second level texels to determine a second level channel value; and
  performing weighted averaging between the channel values to derive interpolated texel data.

10. A texture mapping system, comprising:
  a texture cache, having an output, for storing a multum in parvo (MIP) map having at least two resolution levels, a one of which is a higher resolution level and another of which is a lower resolution level, the texture cache grouping texels in cells of texels and distributing the cells over a plurality of banks of the texture cache;
  a texture-mapping unit for mapping textures to primitives, using trilinear texture filtering, the texture-mapping unit having inputs and outputs, the input of the texture-mapping unit coupled to output of the texture cache for receiving texels, the texture-mapping unit producing a texture color value from two levels of detail based on texels retrieved from only a single one of the at least two resolution levels;
  wherein the texture-mapping unit further comprises:
    a first level generator having an input and an output for generating a first color value for a first level of detail, the input of the first level generator coupled to the output of the texture cache;
    a second level generator having an input and an output for generating a second color value for a second level of detail less than the first level of detail, the input of the second level generator coupled to the output of the first level generator; and
    an interpolator having a first input, a second input and an output for producing a texture color value from the first and second color values, the first input of the interpolator coupled to the output of the first level generator, the second input of the interpolator coupled to the output of the second level generator.

11. The system of claim 10, wherein the texture cache includes a plurality of texels, group in 2×2 texel cells, and wherein the cells are grouped in units with four cells per unit, and wherein there are four banks, each bank having 16 units.

12. The system of claim 10, wherein the texture cache are addressable on a cell by cell basis and are organized in block of eight by eight texels, and wherein for each block one unit is located in each bank.

13. The system of claim 10, further comprising a sample producer for producing texels at the second level from a plurality of texels at the first level of detail, the sample producer having an input and an output, the input of the sample producer coupled to the output of the texture cache and the output of the sample producer coupled to the input of the second level generator.

14. The system of claim 10, wherein the sample producer further comprises a plurality of adders each adder coupled to the texture cache to receive texels for a 2×2 texel neighborhood, the adders summing the texel values for the 2×2 texel neighborhood to produce a texel for a second level of detail.

15. The system of claim 10, wherein the sample producer comprises four adders.

16. The system of claim 10, wherein:
  the second level generator is an weighted averaging unit,
  the second level generator receives fractional values (α, β) for a pixel being mapped, and
  the weighted averaging unit generates the texture color according to the equation $$v_2(P_{n+1}) = \alpha(\beta v(D) + (1-\beta)v(B)) + (1-\alpha)(\beta v(C) + (1-\beta)v(A))$$

where v(A), v(B), v(C) and v(D) are the outputs of the plurality of adders.

17. The system of claim 10, wherein the first level generator comprises:
  a plurality of multiplexers, each multiplexer coupled to the texture cache for receiving a plurality of texels, each multiplexer coupled to receive a cell address, the plurality of multiplexers each selecting a texel for output according to a cell address applied to the respective multiplexer; and a weighted averaging unit having a plurality of inputs, respective inputs of the weighted averaging unit coupled to corresponding outputs of the plurality of multiplexers, at least some of the inputs coupled to receive fractional values of the cell address, the weighted averaging unit producing a color value for a first level of detail by determining a weight average of the output of the multiplexers using the fractional values.

18. The system of claim 17, wherein the weighted averaging unit receives fractional values ($\alpha$, $\beta$) for a pixel being mapped, and wherein the weighted averaging unit generates the texture color according to the equation $$v_1(P_n)=\alpha_1(\beta_1 v(0)+(1-\alpha_1)v(2))+(1-\alpha_1)(\beta_1 v(1)+(1-\beta_1)v(3))$$

where v(0), v(1), v(2), and v(3) are output by respective multiplexers from the plurality of multiplexers.

19. The system of claim 10, wherein the interpolator also receives a fractional value for the level of detail and interpolates between the color value produced by the first level generator and the second level generator using the fractional value for the level of detail.

* * * * *

UNITED STATES PATENT AND TRADEMARK OFFICE
CERTIFICATE OF CORRECTION

PATENT NO. : 6,304,268 B1
DATED : October 16, 2001
INVENTOR(S) : Iourcha et al.

It is certified that error appears in the above-identified patent and that said Letters Patent is hereby corrected as shown below:

Column 9,
Line 59, that portion of the reading "The texture memory 804" should read -- The texture memory 802 --.
Lines 62 and 66, that portion of the reading "texture memory 804" should read -- texture memory 802 --.

Column 10,
Line 1, that portion of the reading "The texture memory 804" should read -- The texture memory 802 --.
Line 41, that portion of the reading "primitives 202 from" should read -- primitives from --.

Column 11,
Line 10, that portion of the reading "The texture cache 102" should red -- The texture cache 804 --.

Signed and Sealed this

Twenty-fourth Day of May, 2005

JON W. DUDAS
*Director of the United States Patent and Trademark Office*